United States Patent
Tanaka

(10) Patent No.: US 10,295,676 B2
(45) Date of Patent: May 21, 2019

(54) RECEIVING DEVICE AND RECEIVING METHOD

(71) Applicant: SONY CORPORATION, Tokyo (JP)

(72) Inventor: Katsuyuki Tanaka, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 275 days.

(21) Appl. No.: 15/121,221

(22) PCT Filed: Feb. 24, 2015

(86) PCT No.: PCT/JP2015/055136
§ 371 (c)(1),
(2) Date: Aug. 24, 2016

(87) PCT Pub. No.: WO2015/133319
PCT Pub. Date: Sep. 11, 2015

(65) Prior Publication Data
US 2017/0010361 A1   Jan. 12, 2017

(30) Foreign Application Priority Data
Mar. 5, 2014   (JP) ................. 2014-042407

(51) Int. Cl.
| G01S 19/24 | (2010.01) |
| G01S 19/31 | (2010.01) |
| G01S 19/33 | (2010.01) |
| G01S 19/46 | (2010.01) |
(Continued)

(52) U.S. Cl.
CPC .......... G01S 19/31 (2013.01); G01S 19/24 (2013.01); G01S 19/33 (2013.01); G01S 19/425 (2013.01); G01S 19/46 (2013.01); G01S 19/48 (2013.01)

(58) Field of Classification Search
CPC ........ G01S 19/24; G01S 19/33; G01S 19/425; G01S 19/31; G01S 19/46; G01S 19/48
USPC ............ 342/357.31, 357.46, 357.63, 357.73; 701/468, 470
See application file for complete search history.

(56) References Cited

FOREIGN PATENT DOCUMENTS

| JP | 2002-043975 A | 2/2002 |
| JP | 2004-536508 A | 12/2004 |
| JP | 2005-033803 A | 2/2005 |
(Continued)

OTHER PUBLICATIONS

U B Syed et al., "3-Dimensional Approach to WiFi Indoor Positioning", Proceedings of the 24th International Technical Meeting of the Satellite Division of the Institute of Navigation, Portland, Or, Sep. 2011, pp. 2861-2865.

*Primary Examiner* — Dao L Phan
(74) *Attorney, Agent, or Firm* — Chip Law Group

(57) ABSTRACT

The present disclosure relates to a receiving device and a receiving method that can receive both signals of a GNSS signal and a wireless LAN at lower cost and more compactly. A selecting unit selects either a received GNSS signal or wireless LAN signal. By multiplying the signal selected in the selecting unit by a local oscillation signal generated in a local oscillation circuit, a converting unit converts the selected signal into an IF signal with lower intermediate frequency. A control unit controls the selecting unit, and performs control so that the GNSS signal and the wireless LAN signal are processed in a time-sharing manner in the converting unit. The technology of the present disclosure can be applied to a receiving device that receives a signal from a GPS satellite, for example.

12 Claims, 19 Drawing Sheets

(51) Int. Cl.
    *G01S 19/42*        (2010.01)
    *G01S 19/48*        (2010.01)

(56)            References Cited

FOREIGN PATENT DOCUMENTS

| | | |
|---|---|---|
| JP | 2005-086581 A | 3/2005 |
| JP | 2008-278059 A | 11/2008 |
| JP | 2010-141867 A | 6/2010 |
| JP | 2011-523999 A | 8/2011 |
| JP | 2012-510073 A | 4/2012 |
| JP | 2013-029364 A | 2/2013 |
| JP | 2013-514533 A | 4/2013 |
| JP | 2013-130515 A | 7/2013 |

RECEIVING DEVICE AND RECEIVING METHOD

CROSS REFERENCE TO RELATED APPLICATIONS

This application is a U.S. National Phase of International Patent Application No. PCT/JP2015/055136 filed on Feb. 24, 2015, which claims priority benefit of Japanese Patent Application No. 2014-042407 filed in the Japan Patent Office on Mar. 5, 2014. Each of the above-referenced applications is hereby incorporated herein by reference in its entirety.

TECHNICAL FIELD

The present disclosure relates to a receiving device and a receiving method, and particularly relates to a receiving device and a receiving method that can receive both signals of a GNSS signal and a wireless LAN at lower cost and more compactly.

BACKGROUND ART

A satellite positioning system (hereinafter referred to as a global navigation satellite system (GNSS)) that determines a current position and speed by receiving signals from satellites includes a global positioning system (GPS) by the United States, a global orbiting navigation satellite system (GLONASS) by Russia, a BeiDou by China, a Galileo by the EU, and a quasi-zenith satellite as a complementary satellite by Japan, for example.

Electronic equipment that uses the GNSS includes, for example, car navigation equipment with a GPS receiver mounted thereon. Basic functions of the GPS receiver are to receive signals from four or more GPS satellites, to calculate a position of the receiver from the received signals, and to inform a user. In other words, the GPS receiver acquires orbital data of the satellite by demodulating the signal from each satellite and then, by a system of equations, derives a three-dimensional position of the receiver from an orbit and time information of the satellite and delay time of the received signal. Since there is an error between time in the GPS receiver and time in the satellite, four receiving satellites are required to eliminate influence of such error.

In recent years, the importance of positional information has been increasing, and the positional information has becoming necessary even indoors. However, even if sensitivity of the GNSS receiver becomes high, a signal that can be received from the GNSS satellite indoors (hereinafter also referred to as a GNSS signal) is considerably weak, and the signal that can be received is not a direct wave from the GNSS satellite. Therefore, the GNSS signal may not be able to be received, or even if it is possible to receive the signal, it becomes difficult to use such signal due to a large positioning error.

Accordingly, in recent years, there have been proposed several positioning methods that do not use the GNSS signal indoors. For example, there has been proposed a method of specifying a position by receiving a MAC address, which is unique information of a fixed access point of a wireless LAN, and acquiring an installed position of the fixed access point from such unique information (for example, see Non-Patent Document 1).

CITATION LIST

Non-Patent Document

Non-patent Document 1: "3-Dimensional Approach to WiFi Indoor positioning", ION GNSS2011, Sep. 19-23, 2011, p. 2861-2865.

SUMMARY OF THE INVENTION

Problems to be Solved by the Invention

In order to use the unique information of the fixed access point of the wireless LAN as a complementary of the reception of the GNSS signal, in a receiver, receiving functions of the wireless LAN are required in addition to receiving functions of the GNSS signal and thus, an increase in cost and a mounting area becomes a concern.

The present disclosure has been made in view of the situation described above, and an object of the disclosure is to receive both signals of the GNSS signal and the wireless LAN at lower cost and more compactly.

Solutions to Problems

A receiving device according to one aspect of the present disclosure includes a first receiving unit, a second receiving unit, a selecting unit, a converting unit, and a control unit. The first receiving unit receives a GNSS signal transmitted from a satellite of a satellite positioning system. The second receiving unit receives a wireless LAN signal transmitted from an access point of a wireless LAN. The selecting unit selects either the received GNSS signal or wireless LAN signal. By multiplying the signal selected in the selecting unit by a local oscillation signal generated in a local oscillation circuit, the converting unit converts the selected signal into an IF signal with lower intermediate frequency. The control unit controls the selecting unit, and performs control so that the GNSS signal and the wireless LAN signal are processed in a time-sharing manner in the converting unit.

A receiving device includes a first receiving unit that receives a GNSS signal transmitted from a satellite of a satellite positioning system, a second receiving unit that receives a wireless LAN signal transmitted from an access point of a wireless LAN, a selecting unit, a converting unit, and a control unit. Ina receiving method according to one aspect of the present disclosure, the selecting unit selects either the received GNSS signal or wireless LAN signal. Then, by multiplying the signal selected in the selecting unit by a local oscillation signal generated in a local oscillation circuit, the converting unit converts the selected signal into an IF signal with lower intermediate frequency. Thereafter, the control unit controls the selecting unit, and performs control so that the GNSS signal and the wireless LAN signal are processed in a time-sharing manner in the converting unit.

In one aspect of the present disclosure, either a received GNSS signal or wireless LAN signal is selected in a selecting unit. In addition, in a converting unit, by being multiplied by a local oscillation signal generated in a local oscillation circuit, the signal selected in the selecting unit is converted into an IF signal with lower intermediate frequency. Furthermore, in a control unit, the selecting unit is controlled, and control is performed so that the GNSS signal and the wireless LAN signal are processed in a time-sharing manner in the converting unit.

The receiving device may be an independent device, or may be an internal block or a module of a device.

Effects of the Invention

According to one aspect of the present disclosure, both signals of a GNSS signal and a wireless LAN can be received at lower cost and more compactly.

Note that the effects described herein are not the limitation and may be any of the effects described in the present disclosure.

MODE FOR CARRYING OUT THE INVENTION

<Configuration Example of Receiving Device>

Figure 1:
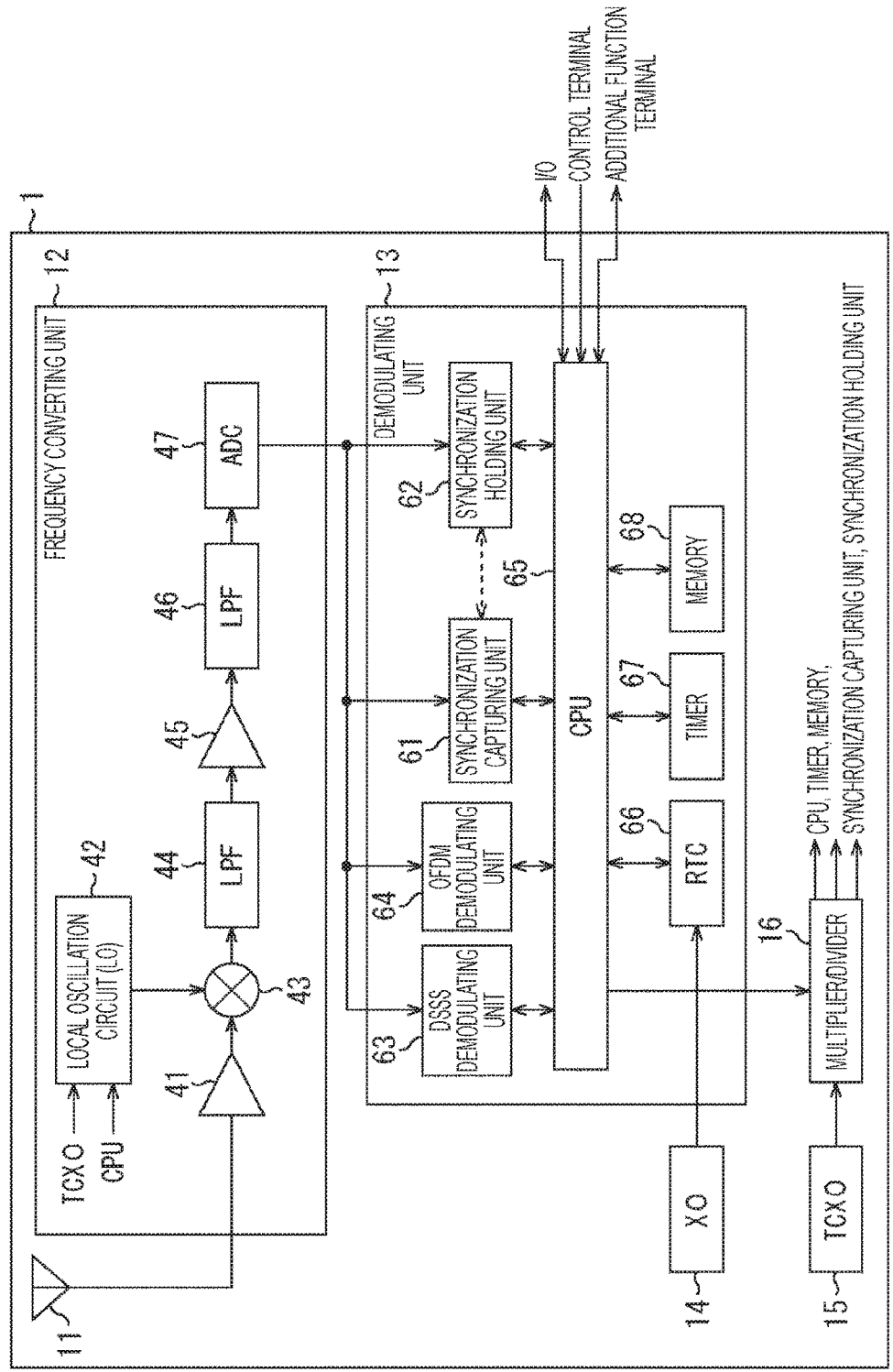
FIG. 1 is a block diagram showing an embodiment of a receiving device according to the present disclosure.

FIG. 1 is a block diagram showing an embodiment of a receiving device according to the present disclosure.

A receiving device 1 shown in FIG. 1 is a global positioning system (GPS) receiver that measures a current position by receiving a GPS signal transmitted from a GPS satellite which is one kind of global navigation satellite systems (GNSS).

In addition, the receiving device 1 can also receive, for example, a wireless local area network (LAN) typified by WiFi (registered trademark). The wireless LAN is, however, provided complementarily in a case where the reception of the GPS signal is difficult, i.e., a case where the corresponding device is indoors, in order to use unique information of a fixed access point of the wireless LAN. Therefore, the receiving device 1 is able to receive using the wireless LAN, but is unable to transmit. In other words, among a transmitting function and a receiving function of the wireless LAN, the receiving device 1 has only the receiving function. As systems for the wireless LAN, there are, for example, an IEEE 802.11b system that uses a 2.5 GHz band, and an IEEE 802.11a system that uses a 5 GHz band.

The receiving device 1 includes an antenna 11, a frequency converting unit 12, a demodulating unit 13, a x'tal oscillator (XO) 14, a temperature compensated x'tal oscillator (TCXO) 15, and a multiplier/divider 16.

The antenna 11 receives a signal (hereinafter referred to as a RF signal) with high frequency transmitted from an access point (hereinafter referred to as AP) of the GPS satellite or the wireless LAN, and supplies such signal to the frequency converting unit 12.

The frequency converting unit 12 converts the RF signal received by the antenna 11 into an intermediate frequency signal (IF signal) with intermediate frequency (IF), and outputs the IF signal to the demodulating unit 13.

The frequency converting unit 12 includes a low noise amplifier (LNA) 41, a local oscillation circuit (LO) 42, a multiplying unit 43, a low pass filter (LPF) 44, an amplifier 45, an LPF 46, and an analog digital converter (ADC) 47.

The LNA 41 amplifies the RF signal supplied from the antenna 11, and supplies such signal to the multiplying unit 43.

The local oscillation circuit 42 includes, for example, a phase lock loop (PLL) circuit, and generates a local oscillation signal that has a predetermined frequency (hereinafter referred to as LO frequency) on the basis of a oscillation signal supplied from the TCXO 15 described later. The local oscillation circuit 42 is controlled by, for example, a CPU 65 included in the demodulating unit 13. However, such control is not limited to the above, and the local oscillation circuit 42 may be controlled by a control unit of an external device or the like.

By multiplying the RF signal supplied from the LNA 41 and the local oscillation signal supplied from the local oscillation circuit 42, the multiplying unit 43 outputs an IF signal which has been down-converted into intermediate frequency (IF) lower than carrier frequency in accordance with the local oscillation signal. Typical intermediate frequency is, for example, 4.092 MHz, 1.023 MHz, or 0 Hz. However, the intermediate frequency is not limited thereto.

The LPF 44 extracts a low frequency component from frequency components of the IF signal supplied from the multiplying unit 43, and supplies a signal that has the extracted low frequency component to the amplifier 45.

The amplifier 45 amplifies the IF signal supplied from the LPF 44, and supplies the signal to the LPF 46. The amplifier 45 may include, for example, an operational amplifier. However, the configuration is not limited to the above.

The LPF 46 extracts a low frequency component from frequency components of the IF signal amplified by the amplifier 45, and supplies a signal that has the extracted low frequency component to the ADC 47. Note that, in FIG. 1, the example in which the LPF 46 is disposed between the amplifier 45 and the ADC 47 has been described; however, a BPF may be disposed between the amplifier 45 and the ADC 47.

The ADC 47 converts the IF signal in an analog format supplied from the LPF 46 into an digital format by sampling, and supplies the IF signal that has been converted into the digital format to the demodulating unit 13 (a synchronization capturing unit 61 and a synchronization holding unit 62 thereof). From the reception at the antenna 11 to the ADC 47 is an analog circuit that performs a signal process in the analog format, and the demodulating unit 13 which is a stage after the ADC 47 is a digital circuit that performs a signal process in the digital format.

The demodulating unit 13 performs a demodulating process of the IF signal output from the frequency converting unit 12, and outputs a position of the receiving device 1 as a process result.

The demodulating unit 13 includes the synchronization capturing unit 61, the synchronization holding unit 62, the CPU 65, an RTC 66, a timer 67, and a memory 68.

Under the control of the CPU 65, the synchronization capturing unit 61 captures a synchronization in a pseudo random noise (PRN) code of the IF signals output from the frequency converting unit 12 on the basis of the multiplied and/or divided oscillation signal supplied from the multiplier/divider 16. Furthermore, the synchronization capturing unit 61 detects carrier frequency of the IF signal. The synchronization capturing unit 61, then, supplies a phase of the PRN code, the carrier frequency of the IF signal, and the like to the synchronization holding unit 62 and the CPU 65.

<Configuration Example of Synchronization Capturing Unit>

Figure 2:
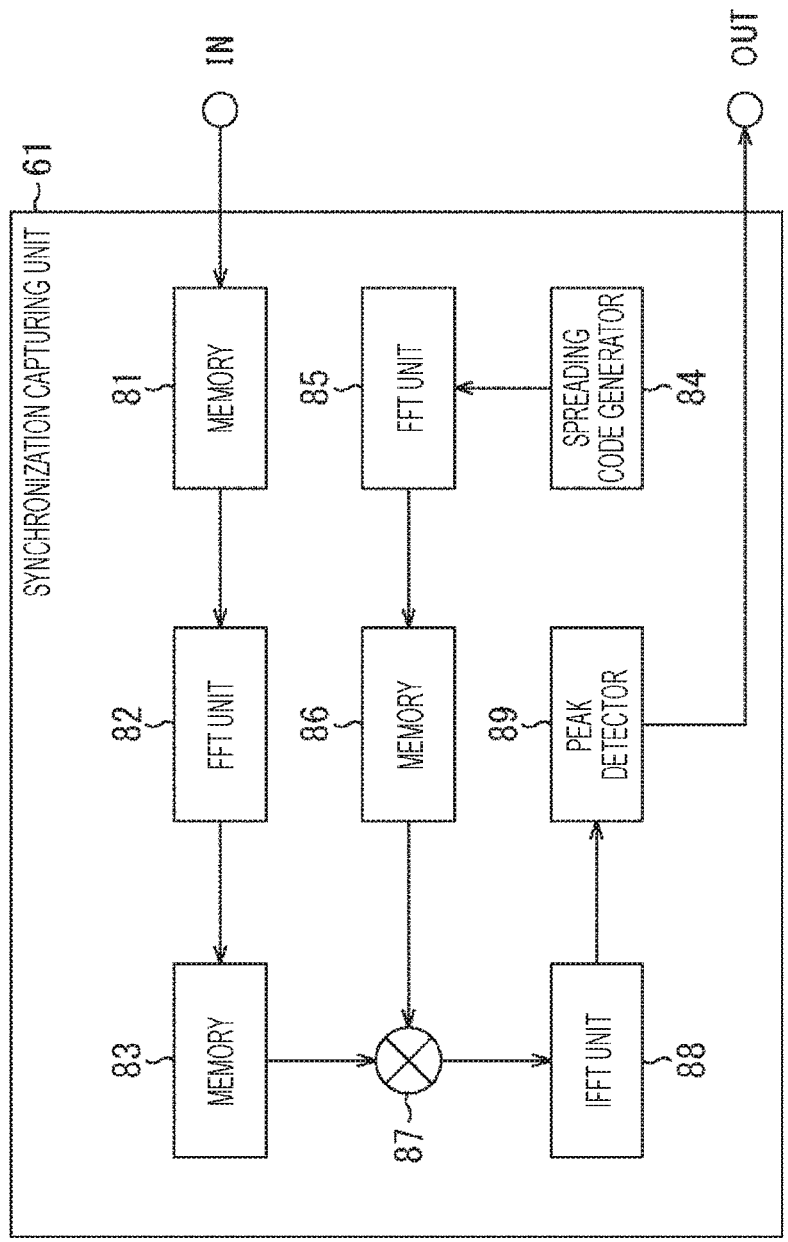
FIG. 2 is a block diagram showing a configuration example of a synchronization capturing unit.

FIG. 2 is a block diagram showing a configuration example of the synchronization capturing unit 61.

In order to capture the synchronization of spreading codes at high speed, the synchronization capturing unit 61 can include, for example, a digital matched filter that uses fast Fourier transform (FFT) as shown in FIG. 2.

The synchronization capturing unit 61 includes a memory 81, an FFT unit 82, a memory 83, a spreading code generator 84, an FFT unit 85, a memory 86, a multiplying unit 87, an inversed fast Fourier transform (IFFT) unit 88, and a peak detector 89.

The memory 81 buffers the IF signal sampled by the ADC 47 of the frequency converting unit 12. The FFT unit 82 reads the IF signal buffered by the memory 81 to perform the fast Fourier transform. The memory 83 buffers a frequency domain signal converted from the IF signal in a time domain by the fast Fourier transform in the FFT unit 82.

Meanwhile, the spreading code generator 84 generates a spreading code identical to the spreading code in the RF signal from the GPS satellite. The FFT unit 85 performs the fast Fourier transform of the spreading code generated by the spreading code generator 84. The memory 86 buffers a spreading code in a frequency domain converted from the spreading code in a time domain by the fast Fourier transform in the FFT unit 85.

The multiplying unit 87 multiplies the frequency domain signal buffered by the memory 83 and the spreading code in the frequency domain buffered by the memory 86. The IFFT unit 88 performs inversed fast Fourier transform of the multiplied frequency domain signal output from the multiplying unit 87. Accordingly, there is acquired a correlation signal in a time domain between the spreading code in the RF signal from the GPS satellite and the spreading code generated by the spreading code generator 84. Thereafter, the peak detector 89 detects a peak of the correlation signal output from the IFFT unit 88.

Such synchronization capturing unit 61 may be implemented as software that executes, using a digital signal processor (DSP), each process of the FFT units 82 and 85, the spreading code generator 84, the multiplying unit 87, the IFFT unit 88, and the peak detector 89.

Figure 3:
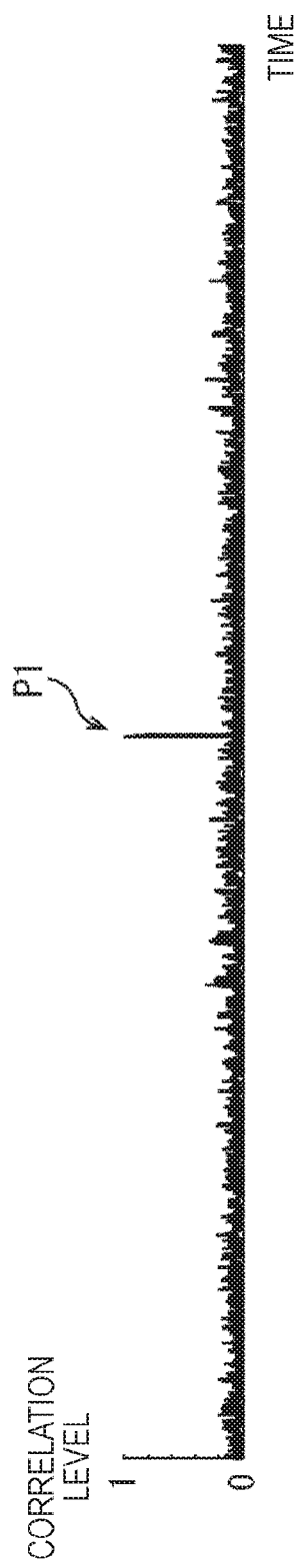
FIG. 3 is a diagram describing a process of the synchronization capturing unit.

FIG. 3 is a diagram showing an example of the peak of the correlation signal captured by the synchronization capturing unit 61.

Referring to FIG. 3, there is detected a peak P1 where correlation level spikes in one cycle of an output waveform of the correlation signal. A position of such peak P1 on a time axis corresponds to a head of the spreading code. That is, by detecting the peak P1 described above, the synchronization capturing unit 61 can detect a synchronization of the signals received from the GPS satellites (in other words, can detect the phase of the spreading code)

Returning to FIG. 1, on the basis of the control by the CPU 65, the synchronization holding unit 62 holds a synchronization of a PRN code of the IF signal supplied from the ADC 47 and a carrier by using the signal supplied from the multiplier/divider 16. More specifically, the synchronization holding unit 62 operates having the phase of the PRN code, which is supplied from the synchronization capturing unit 61, and the carrier frequency of the IF signal as initial values. Thereafter, the synchronization holding unit 62 demodulates a navigation message from the GPS satellite included in the IF signal supplied from the ADC 47 and then, supplies the demodulated navigation message, the phase of the PRN code with high accuracy, and the carrier frequency to the CPU 65.

In a case of receiving, from the ADC 47, the IF signal of the wireless LAN in the IEEE 802.11b system, a DSSS demodulating unit 63 performs a frame synchronization process, a demodulating process that corresponds to the IEEE 802.11b system, and the like, to acquire a MAC address which is unique information of the AP included in the received signal. A modulation method in the case where a communication system of the wireless LAN is the IEEE 802.11b system is a direct sequence spectrum spread (DSSS) method.

In a case of receiving, from the ADC 47, the IF signal of the wireless LAN in the IEEE 802.11a system, an OFDM demodulating unit 64 performs the frame synchronization process, a demodulating process that corresponds to the IEEE 802.11a system, and the like, to acquire the MAC address which is the unique information of the AP included in the received signal. A modulation method in the case where a communication system of the wireless LAN is IEEE 802.11a system is an orthogonal frequency division multiple (OFDM) method.

On the basis of the navigation message, the phase of the PRN code, and the carrier frequency supplied from the synchronization holding unit 62, the CPU 65 determines the position and the speed of each GPS satellite, calculates the position of the receiving device 1, and stores them in the memory 68.

In addition, the CPU 65 acquires the MAC addresses of the AP acquired from the demodulation by the DSSS demodulating unit 63 and the OFDM demodulating unit 64, and stores the MAC addresses in the memory 68.

The CPU 65 is connected to a control terminal, an I/O terminal, an additional function terminal, and the like, and data and control signals necessary for processes are input/output via the terminals.

The real time clock (RTC) 66 measures time on the basis of an oscillation signal supplied from the XO 14. The time information measured by the RTC 66 is used until time information of the GPS satellite is acquired, for example. When the time information of the GPS satellite is acquired, correction is appropriately made by the control of the timer 67 by the CPU 65.

The timer 67 is used, for example, for generating various timing signals that control the operation of each unit of the receiving device 1 in the CPU 65, and is used as a reference to time.

The memory 68 includes a read only memory (ROM), a random access memory (RAM), and the like. Programs and control data such as calculation parameter used by the CPU 65 are recorded in the ROM included in the memory 68. In addition, programs and the like executed by the CPU 65 are temporarily stored in the RAM.

The XO 14 generates an oscillation signal that has, for example, predetermined oscillation frequency of 32.768 kHz. Then, the XO 14 supplies the generated oscillation signal to the RTC 66.

The TCXO 15 generates an oscillation signal with 18.414 MHz, for example, which is different in frequency from the oscillation signal generated by the XO 14. Then, the TCXO 15 supplies the generated oscillation signal to, for example, the multiplier/divider 16 and the local oscillation circuit 42 of the frequency converting unit 12.

The multiplier/divider 16 multiplies and/or divides the oscillation signal supplied from the TCXO 15 on the basis of an instruction from the CPU 65. Then, the multiplier/divider 16 supplies the signal that has been multiplied and/or divided to the demodulating unit 13 and the like.

The receiving device 1 configured as described above is capable of receiving a desired signal among the GPS signal, which is the RF signal from the GPS satellite, and the wireless LAN signal, which is the RF signal from the AP of the wireless LAN.

Figure 4:
FIG. 4 is a block diagram showing a configuration example of the synchronization capturing unit.

In addition, as shown in FIG. 4, the receiving device 1 is capable of receiving the GPS signal and the wireless LAN signal in a time-sharing manner, thereby acquiring both data.

<Format of GPS Signal>

Figure 5:
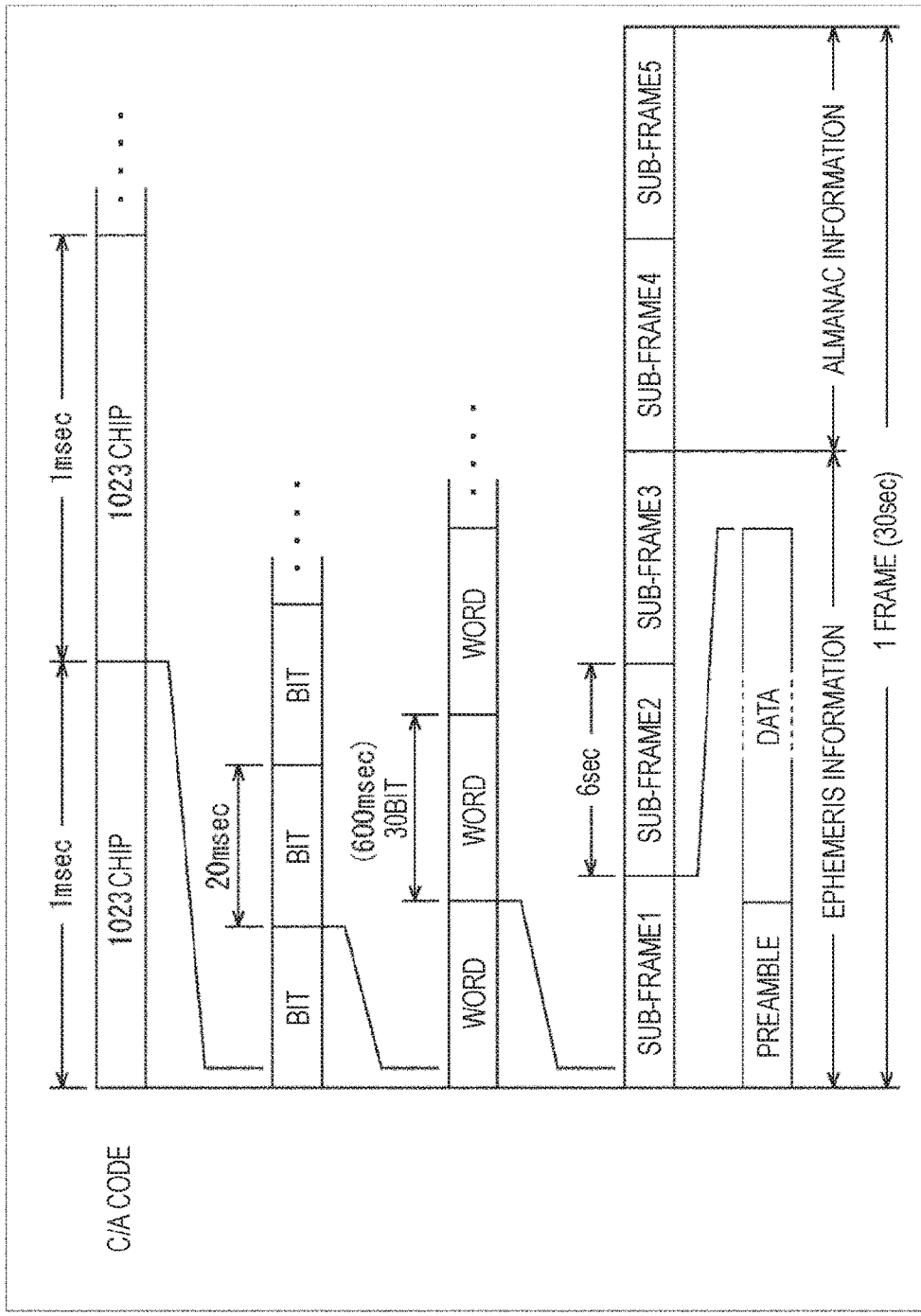
FIG. 5 is a diagram describing a GPS signal.

FIG. 5 is a diagram describing the GPS signal transmitted from the GPS satellite.

The GPS signal transmitted from the GPS satellite is a spread spectrum signal called an L1 band and a clear and acquisition (C/A) code. The signal called the L1 band and the C/A code has a transmission signal speed, i.e., a chip rate, at 1.023 MHz, and is a spreading code in a pseudo-random noise (PN) sequence in which, for example, a code length of a so-called Gold code is 1023. Moreover, such signal is a signal in which a carrier wave (hereinafter referred to as a carrier) with 1575.42 MHz of frequency is modulated on the basis of a binary phase shift keying method (hereinafter referred to as a BPSK method) by a signal to which 50 bps of data has been directly spread.

The GPS signal called the L1 band and the C/A code has the chip rate at 1.023 MHz, and the code length is 1023. Therefore, as shown in a first stage in FIG. 5, the C/A code is repeated while having the spreading code of 1023 chip as one period, i.e., one cycle=one millisecond (msec).

The spreading code of the C/A code is different in each GPS satellite. However, the receiving device 1 can detect, in advance, which GPS satellite uses which spreading code. In addition, the receiving device 1 can grasp a signal from which GPS satellite can be received at a certain point and certain time by the navigation message. Therefore, the receiving device 1, in three-dimensional positioning, for example, calculates the position of itself by receiving radio waves from at least four or more GPS satellites that can be acquired at the certain point and the certain time to perform an inverted spread spectrum and then, by performing positioning calculation.

Furthermore, as shown in a second stage in FIG. 5, one bit of the signal data from the GPS satellite is transmitted as 20 cycles of the spreading code, that is, as 20 milliseconds unit. In other words, as described above, the transmission speed of the data is 50 bps. Moreover, one cycle of the spreading code with 1023 chip is inverted between when the bit is "1" and when the bit is "0".

In addition, as shown in a third stage in FIG. 5, the signal from the GPS satellite forms one word by 30 bits, that is, 600 milliseconds. Furthermore, as shown in a fourth stage in FIG. 5, the signal from the GPS satellite forms one sub-frame by 10 words, that is, six seconds. Thereafter, as shown in a fifth stage in FIG. 5, in the signal from the GPS satellite, a preamble which is a defined bit pattern is always inserted into a word at a head of one sub-frame even when the data has been updated, and data is transmitted following the preamble.

Moreover, the signal from the GPS satellite forms one frame by five sub-frames, that is, 30 seconds. Then, the navigation message is transmitted in data unit of one frame in the signal from the GPS satellite.

The first three sub-frames in the data of one frame are unique information of the GPS satellite called ephemeris information. The ephemeris information includes a parameter for determining an orbit of the GPS satellite, and transmission time of the signal from the GPS satellite.

All of the GPS satellites use common time information by each having an atomic clock. The transmission time of the signal from the GPS satellite included in the ephemeris information is set to one second unit of the atomic clock. In addition, the spreading code of the GPS satellite is generated as being synchronized with the atomic clock.

Orbit information included in the ephemeris information is updated every few hours. However, the orbit information is the same until the information is updated. Accordingly, the receiving device 1 can accurately use the same orbit information for few hours by holding the orbit information included in the ephemeris information in the memory. Note that the transmission time of the signal from the GPS satellite is updated every one second.

On the other hand, the navigation messages of the remaining two sub-frames in the data of one frame are information called almanac information, commonly transmitted from all of the GPS satellites. Twenty five frames of the almanac information are required in order to acquire all information. The almanac information includes, for example, information of an approximate position of the GPS satellite, and information that indicates which GPS satellite is available. The almanac information is updated every few months. However, the almanac information is the same until the information is updated. Accordingly, the receiving device 1 can accurately use the same almanac information for few months by holding the almanac information in the memory.

In order to acquire the data described above by receiving the signal from the GPS satellite, first, after removing the carrier, the receiving device 1 captures the signal from the GPS satellite by taking a phase synchronization of the C/A codes in the signals from the GPS satellites using a spreading code identical to the C/A code used in the GPS satellite to be received. The receiving device 1, then, performs the inversed spread spectrum. When the receiving device 1 performs the inversed spread spectrum by taking the phase synchronization of the C/A codes, the bit is detected. Therefore, it becomes possible for the receiving device 1 to acquire the navigation message including time information and the like on the basis of the signal from the GPS satellite.

The receiving device 1 captures the signal from the GPS satellite by searching for the phase synchronization of the C/A codes. As such phase synchronization search, the receiving device 1 detects correlation between a spreading code generated by itself and a spreading code of the received signal from the GPS satellite. When, for example, a correlation value of the correlation detection result is larger than a value determined in advance, the spreading codes are determined as being synchronized.

<Format of Wireless LAN Signal>

Next, the wireless LAN signal transmitted from the AP will be described with reference to FIG. 6.

The receiving device 1 receives a beacon transmitted at predetermined intervals (for example, 100 milliseconds) from the AP of the wireless LAN, and acquires the MAC address which is the unique information of the AP included in the beacon. A beacon length is typically 1 millisecond or less.

Figure 6:
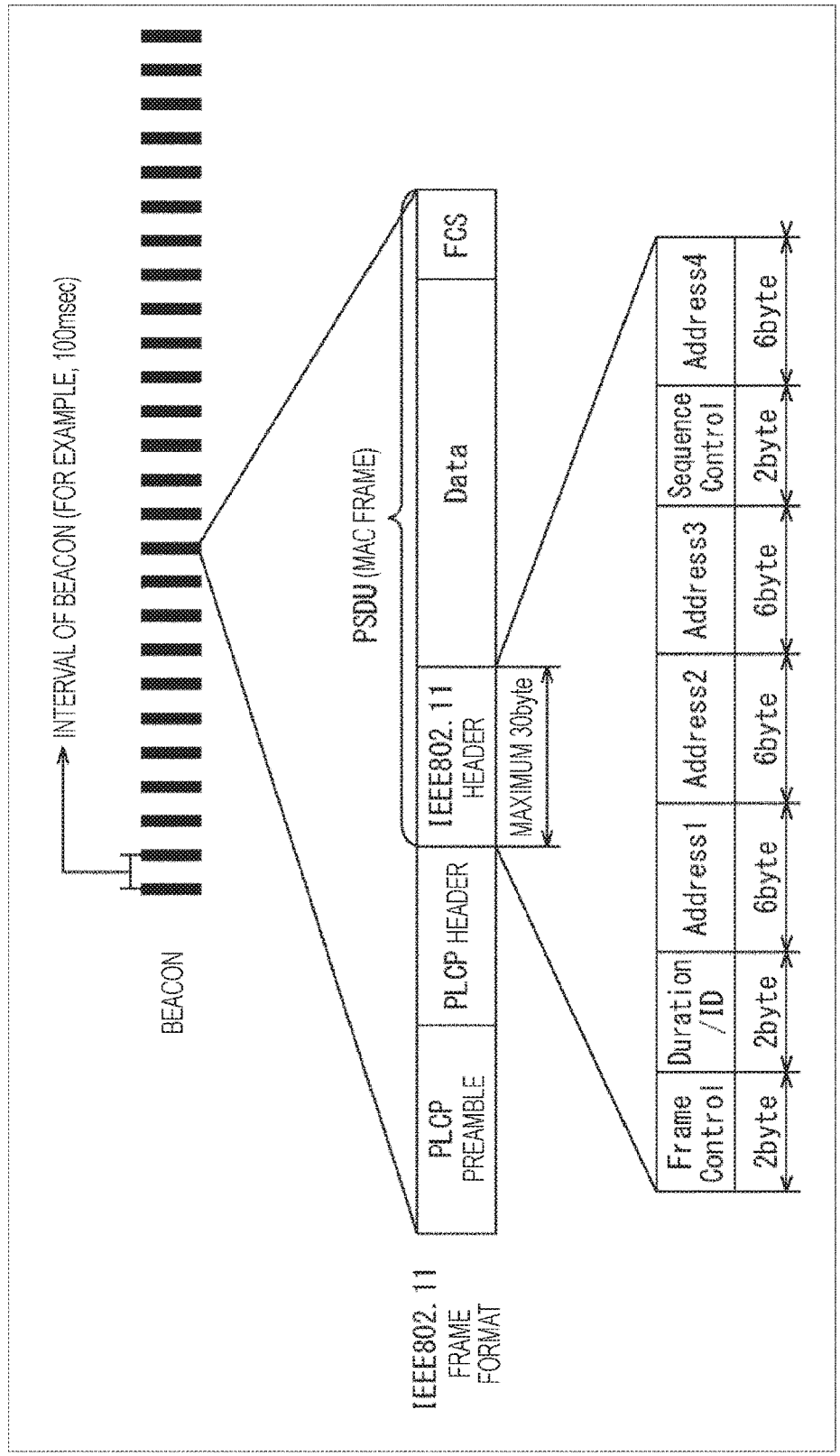
FIG. 6 is a diagram describing a wireless LAN signal.

The beacon is transmitted in an IEEE 802.11 frame format shown in FIG. 6.

The IEEE 802.11 frame format includes a PLCP preamble, a PLCP header, and a PSDU.

The PLCP preamble is a bit string of a synchronous signal added to a head of an IEEE 802.11 frame. Information such as a modulation method (transmission speed) and data length are stored in the PLCP header. The PSDU includes an IEEE 802.11 header and actual data.

The IEEE 802.11 header includes, for example, Frame Control, Duration/ID, Address 1, Address 2, Address 3, Sequence Control, and Address 4.

Information of, for example, types of frame, destination of frame, whether a transmission source is wireless or wired, fragment information, power management, and whether WEP is used are stored in the Frame Control. The types of frame are, for example, a management frame (00) such as the beacon, a control frame (01) such as an Ack frame, and a data frame (10) that indicates transmission of data.

The Duration/ID is a field used in RTS/CTS and the like, and information of a schedule period (time required for frame transmission) of using radio waves is stored therein.

Information of, for example, a MAC address of the destination, a MAC address of the transmission source, and a MAC address of the AP (BSSID) are stored in the Address 1, the Address 2, the Address 3, and the Address 4 in accordance with network configuration.

Information of a sequence number of data to be transmitted or a fragment number in a case of fragmentation is stored in the Sequence Control.

<First Functional Block Diagram of Time-Sharing Reception>

Figure 7:
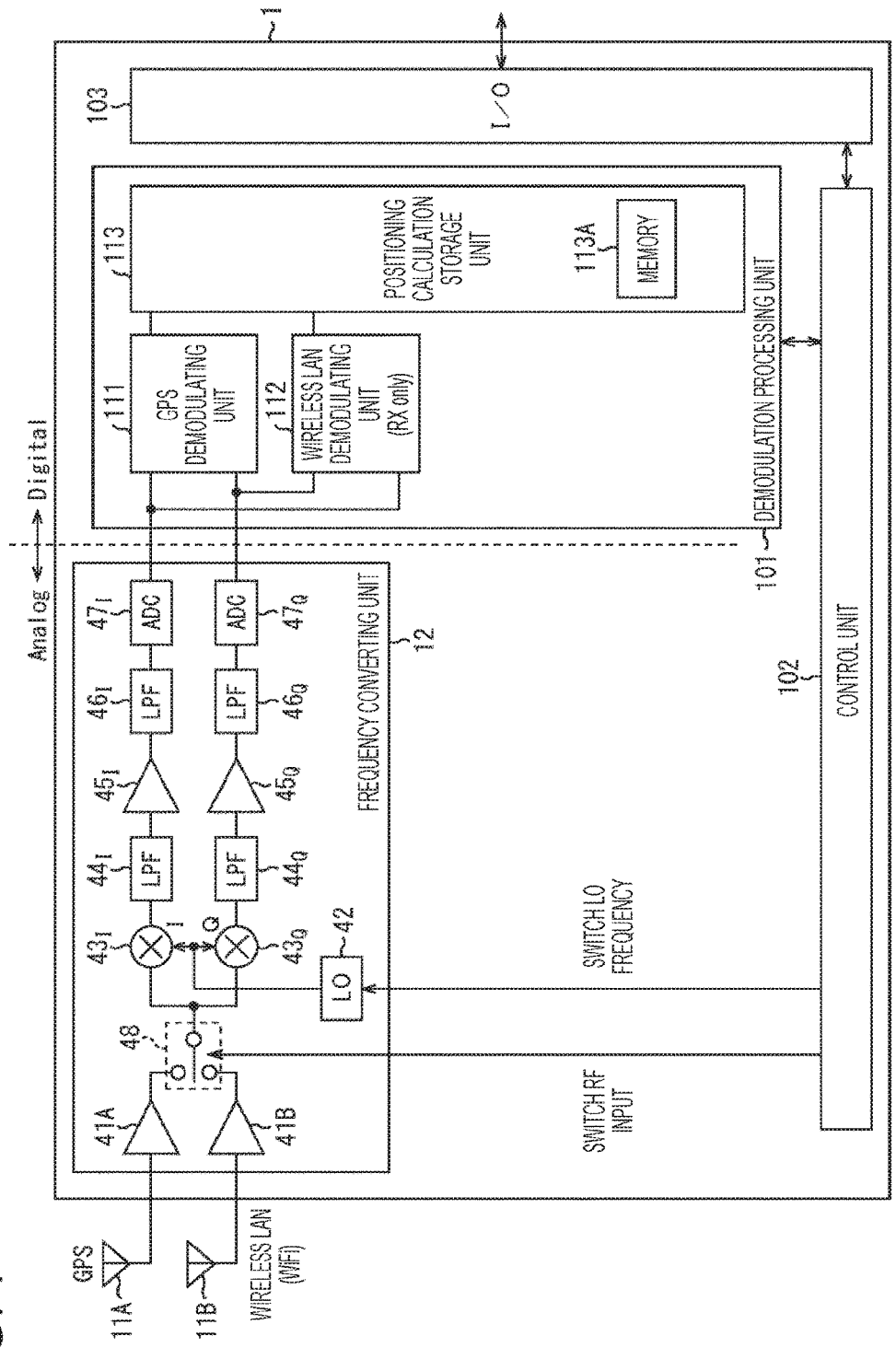
FIG. 7 is a block diagram showing a first functional configuration example of the receiving device.

FIG. 7 is a block diagram showing a first functional configuration example in a case where the receiving device 1 receives the GPS signal and the wireless LAN signal in the time-sharing manner.

The receiving device 1 includes the frequency converting unit 12, a demodulation processing unit 101, a control unit 102, and an I/O 103. The demodulation processing unit 101, the control unit 102, and the I/O 103 correspond to the demodulating unit 13 in FIG. 1.

A detailed configuration of the frequency converting unit 12 is shown in FIG. 7. The frequency converting unit 12 includes an antenna 11A and an LNA 41A for GPS signal reception, and an antenna 11B and an LNA 41B for wireless LAN signal reception.

The antenna 11A, for example, receives the GPS signal with the carrier frequency of a 1.5 GHz band, and supplied such signal to the LNA 41A. Then, the LNA 41A amplifies the GPS signal from the antenna 11A, and supplies such signal to a selector 48.

The antenna 11B, for example, receives the wireless LAN signal of a 2.5 GHz band that corresponds to the IEEE 802.11b system, and supplies such signal to the LNA 41B. Then, the LNA 41B amplifies the wireless LAN signal from the antenna 11B, and supplies such signal to the selector 48.

Under the control of the control unit 102, the selector (selecting unit) 48 selects either an output of the LNA 41A or an output of the LNA 41B, and outputs it to the next stage.

The multiplying unit 43, the LPF 44, the amplifier 45, the LPF 46, and the ADC 47 in the stage after the selector 48 are divided into a block that processes a signal of an I phase component (in-phase component) and a block that processes a signal of a Q phase component (orthogonal component).

Specifically, the block that processes the signal of the I phase component includes the multiplying unit $43_I$, the LPF $44_I$, the amplifier $45_I$, the LPF $46_I$, and the ADC $47_I$. Moreover, the block that processes the signal of the Q phase component includes the multiplying unit $43_Q$, the LPF $44_Q$, the amplifier $45_Q$, the LPF $46_Q$, and the ADC $47_Q$.

The multiplying unit 43, the LPF 44, the amplifier 45, the LPF 46, and the ADC 47 in the stage after the selector 48 process either the GPS signal or the wireless LAN signal supplied from the selector 48 in the time-sharing manner. Therefore, the multiplying unit 43, the LPF 44, the amplifier 45, the LPF 46, and the ADC 47 in the stage after the selector 48 are shared between the GPS signal and the wireless LAN signal.

The LO frequency of the local oscillation signal supplied from the local oscillation circuit 42 to the multiplying unit $43_I$ and the multiplying unit $43_Q$ is controlled by the control unit 102. In a case where the GPS signal is supplied to the stage after the selector 48, the LO frequency is set to, for example, 1,575.42 MHz. On the other hand, in a case where the wireless LAN signal is supplied to the stage after the selector 48, the LO frequency is set to, for example, 2,400 to 2,500 MHz.

The demodulation processing unit 101 includes a GPS demodulating unit 111, a wireless LAN demodulating unit 112, and a positioning calculation storage unit 113.

The GPS demodulating unit 111 demodulates the GPS signal input from the frequency converting unit 12, and supplies a demodulation result to the positioning calculation storage unit 113.

The wireless LAN demodulating unit 112 demodulates the wireless LAN signal input from the frequency converting unit 12, and supplies a demodulation result to the positioning calculation storage unit 113.

By using orbital data of the GPS satellite supplied as the demodulation result from the GPS demodulating unit 111, the positioning calculation storage unit 113 calculates, by a system of equations, a three-dimensional position of the receiving device 1 from an orbit and the time information of the GPS satellite, and from delay time of the received signal. The positioning calculation storage unit 113 stores the calculated three-dimensional position in a memory 113A therein.

In addition, the positioning calculation storage unit 113 stores the MAC address of the AP supplied as the demodulation result from the wireless LAN demodulating unit 112 in the memory 113A therein.

On the basis of a predetermined clock signal, the control unit 102 controls the selector 48 of the frequency converting unit 12. In other words, the control unit 102 switches between the GPS signal and the wireless LAN signal to be output to the stage after the selector 48.

Furthermore, while switching the selector 48, the control unit 102 controls the LO frequency of the local oscillation circuit 42. In other words, in the case where the GPS signal is supplied to the stage after the selector 48, the control unit 102 sets the LO frequency to 1,575.42 MHz. On the other hand, in the case where the wireless LAN signal is supplied to the stage after the selector 48, the control unit 102 sets the LO frequency to 2,400 to 2,500 MHz.

The control unit 102 also controls an output, via the I/O 103, of the three-dimensional position of the receiving device 1 and the MAC address stored in the memory 113A to the outside.

<Example of Time-Sharing Control>

Figure 8:
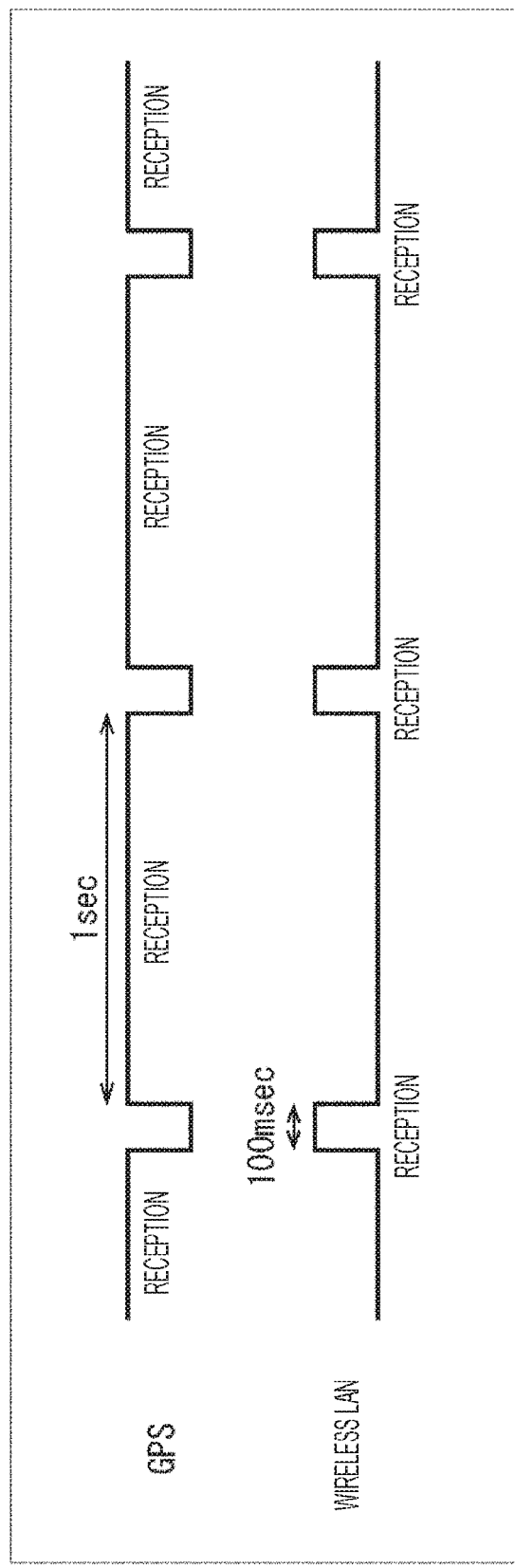
FIG. 8 is a diagram showing an example of time-sharing control of the GPS signal and the wireless LAN signal.

FIG. 8 shows an example of time-sharing control of the GPS signal and the wireless LAN signal.

As shown in FIG. 8, the control unit 102, for example, performs control so that reception of the GPS signal in one second and reception of the wireless LAN signal in 100 milliseconds are executed alternately. A reception period of the wireless LAN signal is appropriately set in accordance with the output interval of the beacon. The time interval of 100 milliseconds, at which the beacon is output, means that the beacon can always be received during one reception period if there are 100 milliseconds in the reception period of the wireless LAN signal.

<Process Flow of Time-Sharing Reception Process>

Figure 9:
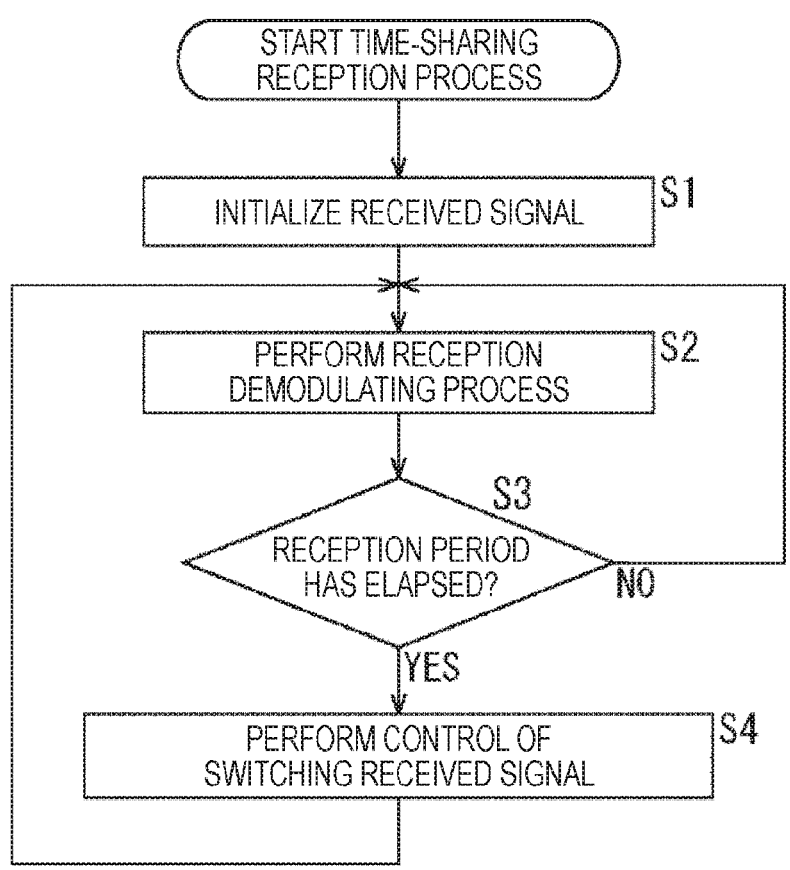
FIG. 9 is a flowchart describing a time-sharing reception process.

FIG. 9 shows a flowchart of a time-sharing reception process performed by the receiving device 1.

First, in step S1, the control unit 102 of the receiving device 1 initializes the received signal. For example, in a case where, first, the GPS signal is received, the control unit 102 controls the selector 48 so as to select the output of the LNA 41A, and sets the LO frequency of the local oscillation circuit 42 to 1,575.42 MHz.

In step S2, the receiving device 1 performs a receiving/demodulating process of the selected signal. In other words, in a case where the selector 48 selects the output of the LNA 41A, the receiving device 1 executes, for example, the reception, the conversion into the IF signal, and the demodulation of the GPS signal from the antenna 11A, and the calculation of the three-dimensional position. On the other hand, in a case where the selector 48 selects an output of the LNA 41B, the receiving device 1 executes, for example, the reception, the conversion into the IF signal, and the demodulation of the wireless LAN signal from the antenna 11B, and the extraction of the MAC address. The three-dimensional position and the MAC address acquired by the receiving/demodulating process are stored in the memory 113A.

In step S3, the control unit 102 determines whether the reception period of the currently received RF signal has elapsed. As in the example in FIG. 8, in a case where the currently received RF signal is the GPS signal, it is determined whether one second has elapsed. On the other hand, in a case where the currently received RF signal is the wireless LAN signal, it is determined whether 100 milliseconds has elapsed.

When it is determined that the reception period of the currently received RF signal has not elapsed in step S3, the process returns to step S2. As a result, the receiving/demodulating process of the currently received RF signal is continuously executed.

On the other hand, when it is determined that the reception period of the currently received RF signal has elapsed in step S3, the process proceeds to step S4, and the control unit 102 performs control of switching the received signal. Specifically, in a case where the GPS signal is currently received, the control unit 102 controls the selector 48 so as to select the output of the LNA 41B, and sets the LO frequency of the local oscillation circuit 42 to 2,400 to 2,500 MHz. On the other hand, in a case where the wireless LAN signal is currently received, the control unit 102 controls the selector 48 so as to select the output of the LNA 41A, and sets the LO frequency of the local oscillation circuit 42 to 1,575.42 MHz.

After the process in step S4, the process returns to step S2, and the processes thereafter are repeated.

The process shown in FIG. 9, via the I/O 103, starts when the start of the time-sharing reception process is instructed, and ends when the end of the time-sharing reception process is instructed, for example.

As described above, according to the first functional configuration example of the receiving device 1, both of the GPS signal and the wireless LAN signal can be received by sharing the signal process blocks, into which the received IF signals have been down-converted, to receive the GPS signal and the wireless LAN signal in the time-sharing manner. As a result, it becomes possible for the receiving device 1 that receives both of the GPS signal and the wireless LAN signal to be lower at cost and more compact.

In addition, by receiving the GPS signal and the wireless LAN signal in the time-sharing manner, the MAC address (unique information) of the AP of the wireless LAN can be acquired and stored as the complementary in a place difficult to receive from the GPS satellite. As described later, the MAC address can be converted into the position of the receiving device 1 by collating with an access point DB storing positional information that indicates the position where the AP that has the MAC address is disposed.

Note that, in the example described above, the antenna 11B, which receives the wireless LAN signal, has received the signal of the 2.5 GHz band that corresponds to the IEEE 802.11b system; however, a signal of a 5 GHz band that corresponds to the IEEE 802.11a system, or a signal of other frequency bands or wireless communicating standards may also be received.

<Another Example of Time-Sharing Control>

In the example described above, the reception of the GPS signal in one second and the reception of the wireless LAN signal in 100 milliseconds have been executed alternately. However, the reception period for receiving the GPS signal can be changed in accordance with reception strength of the GPS signal.

The reception strength of the GPS signal can be determined by a Carrier to Noise (C/N) ratio of the received signal, and can be classified into three levels of strong level, medium level, and weak level, for example. The C/N ratio of the received signal can be calculated, for example, by using a correlation value between the spreading code generated in the synchronization holding unit 62 by itself and the spreading code of the GPS signal. A method of estimating the C/N ratio using the correlation value is disclosed in Inside GNSS, 2009, 9-10, pp. 20-29. However, the method is not limited thereto.

Figure 10:
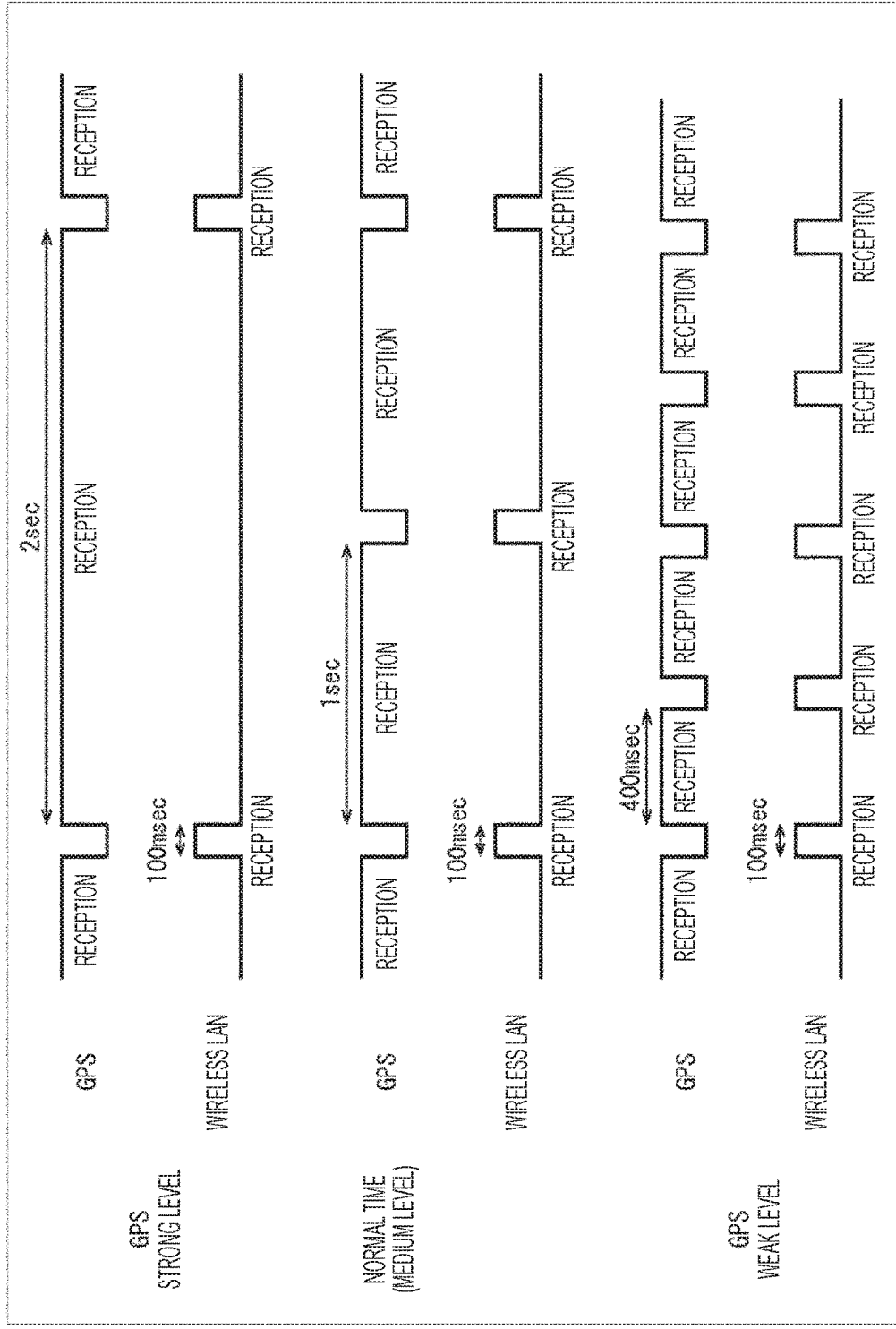
FIG. 10 is a diagram describing another example of time-sharing control.

For example, as shown in FIG. 10, in a case where the reception strength of the GPS signal is at normal level (medium level), the control unit 102 performs control so that the reception of the GPS signal in one second and the reception of the wireless LAN signal in 100 milliseconds are executed alternately.

On the other hand, in a case where the reception strength of the GPS signal is at a stronger level than the normal level (strong level), the control unit 102, for example, alternately executes the reception of the GPS signal in two seconds and the reception of the wireless LAN signal in 100 milliseconds. In other words, in the case where the reception strength of the GPS signal is at the stronger level than the normal level, the control unit 102 reduces a reception frequency of the wireless LAN signal.

Conversely, in a case where the reception strength of the GPS signal is at a weaker level than the normal level (weak level), the control unit 102, for example, alternately executes the reception of the GPS signal in 400 milliseconds and the reception of the wireless LAN signal in 100 milliseconds. In other words, in the case where the reception strength of the GPS signal is at the weaker level than the normal level, the control unit 102 increases the reception frequency of the wireless LAN signal.

Note that, as described with reference to FIG. 5, one bit of the signal data from the GPS satellite corresponds to the signal of 20 milliseconds. Therefore, synchronization establishment and the reception of the GPS signal are possible when there are 400 milliseconds.

<Process Flow of Interval Control Process>

An interval control process that performs the time-sharing control shown in FIG. 10 will be described with reference to a flowchart in FIG. 11. Such process can be executed concurrently with the time-sharing reception process in FIG. 9.

First, in step S11, the control unit 102 of the receiving device 1 determines whether the reception strength of the GPS signal is at the medium level.

When it is determined that the reception strength of the GPS signal is at the medium level in step S11, the process proceeds to step S12. Then, the control unit 102 sets each reception period of the GPS signal to one second, and the process returns to step S11.

On the other hand, when it is determined that the reception strength of the GPS signal is not at the medium level in step S11, the process proceeds to step S13, and the control unit 102 determines whether the reception strength of the GPS signal is at the strong level.

When it is determined that the reception strength of the GPS signal is at the strong level in step S13, the process proceeds to step S14. Then, the control unit 102 sets each reception period of the GPS signal to two seconds, and the process returns to step S11.

When it is determined that the reception strength of the GPS signal is not at the strong level in step S13, the process proceeds to step S15, and the control unit 102 determines whether the reception strength of the GPS signal is at the weak level.

When it is determined that the reception strength of the GPS signal is at the weak level in step S15, the process proceeds to step S16. Then, the control unit 102 sets each reception period of the GPS signal to 400 milliseconds, and the process returns to step S11.

On the other hand, when it is determined that the reception strength of the GPS signal is not at the weak level in step S15, the process returns to step S11.

As described above, the control unit 102 can control each reception period of the GPS signal in accordance with the reception strength of the GPS signal. Therefore, in a case where the reception strength of the GPS signal is weak, it is possible to seamlessly and efficiently perform positioning indoors and outdoors by increasing the reception frequency of the wireless LAN.

Figure 11:
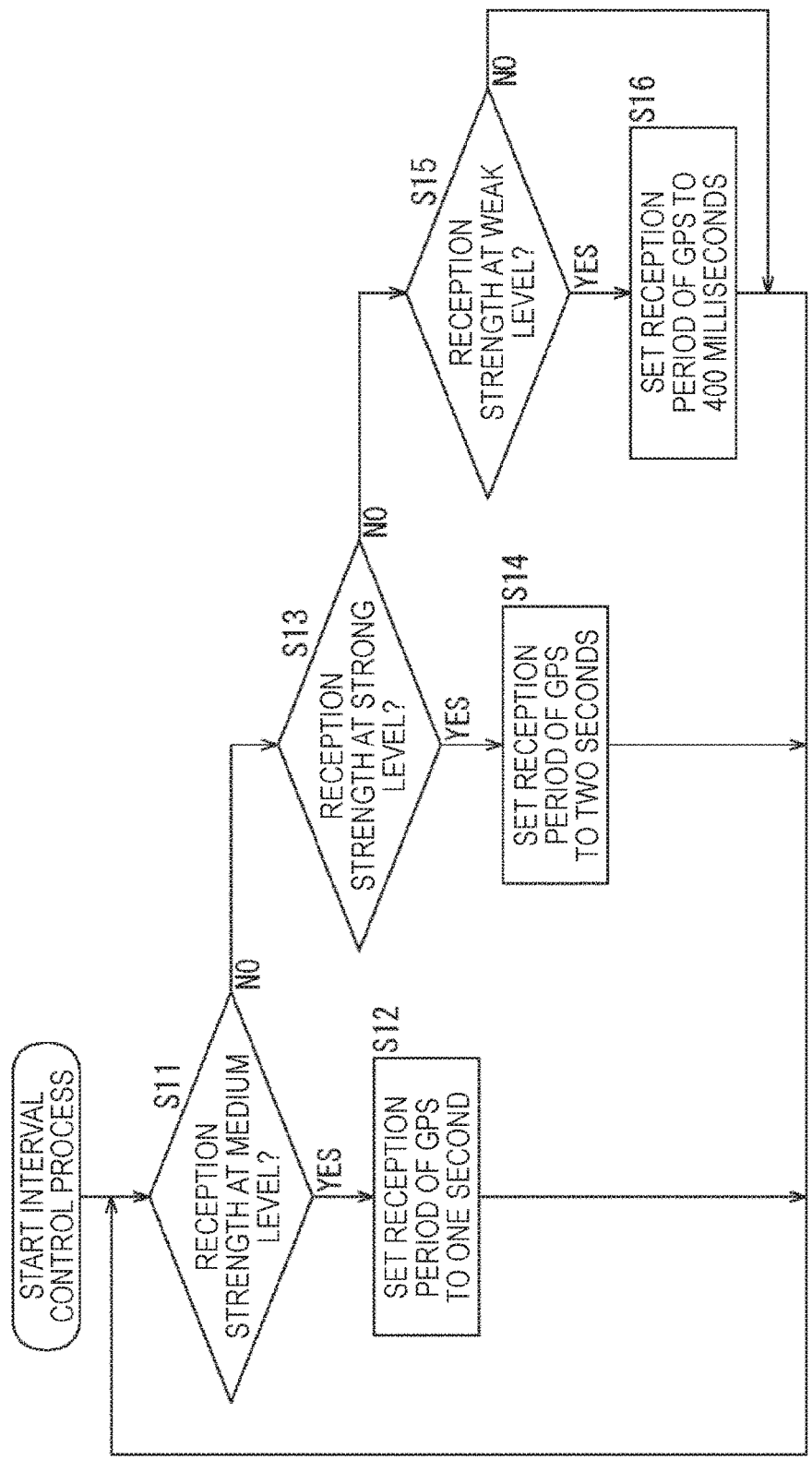
FIG. 11 is a flowchart describing an interval control process.

Note that, in the example in FIG. 11, the reception of the wireless LAN has been performed in a predetermined reception frequency even in a case where the reception strength of the GPS signal is at the strong level; however, the reception of the wireless LAN may be stopped in the case where the reception strength of the GPS signal is at the strong level.

In addition, in a case of performing the reception of the wireless LAN signal from an unknown AP at the beginning, it is necessary to scan a channel (frequency) of such AP. Therefore, the control unit 102 may perform control so that the reception frequency of the wireless LAN increases until the AP is detected, and the reception frequency of the wireless LAN reduces after the AP is detected.

Figure 12:
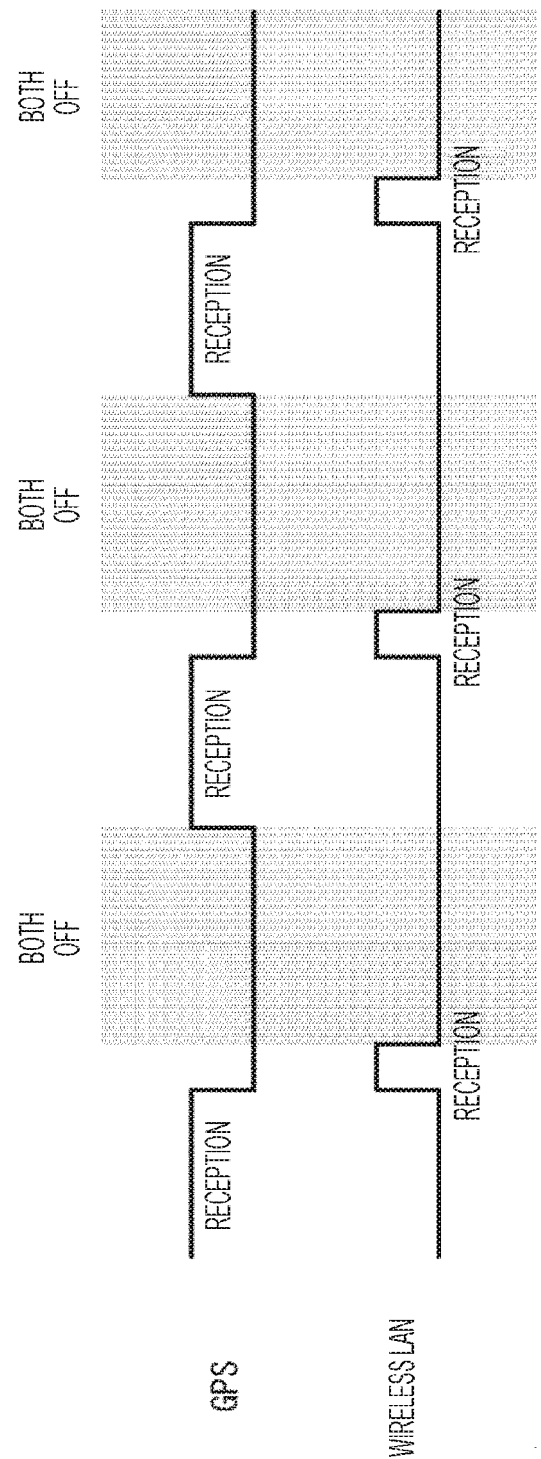
FIG. 12 is a diagram describing another example of the time-sharing control.

Furthermore, in a case where the positioning frequency of the wireless LAN signal may be low, a period where both of the reception of the GPS signal and the reception of the wireless LAN are paused may be provided as shown in FIG. 12. In such case, the power consumption is further reduced.

<Usage Example>

A usage example of the receiving device 1 will be described with reference to FIGS. 13 to 15.

Figure 13:
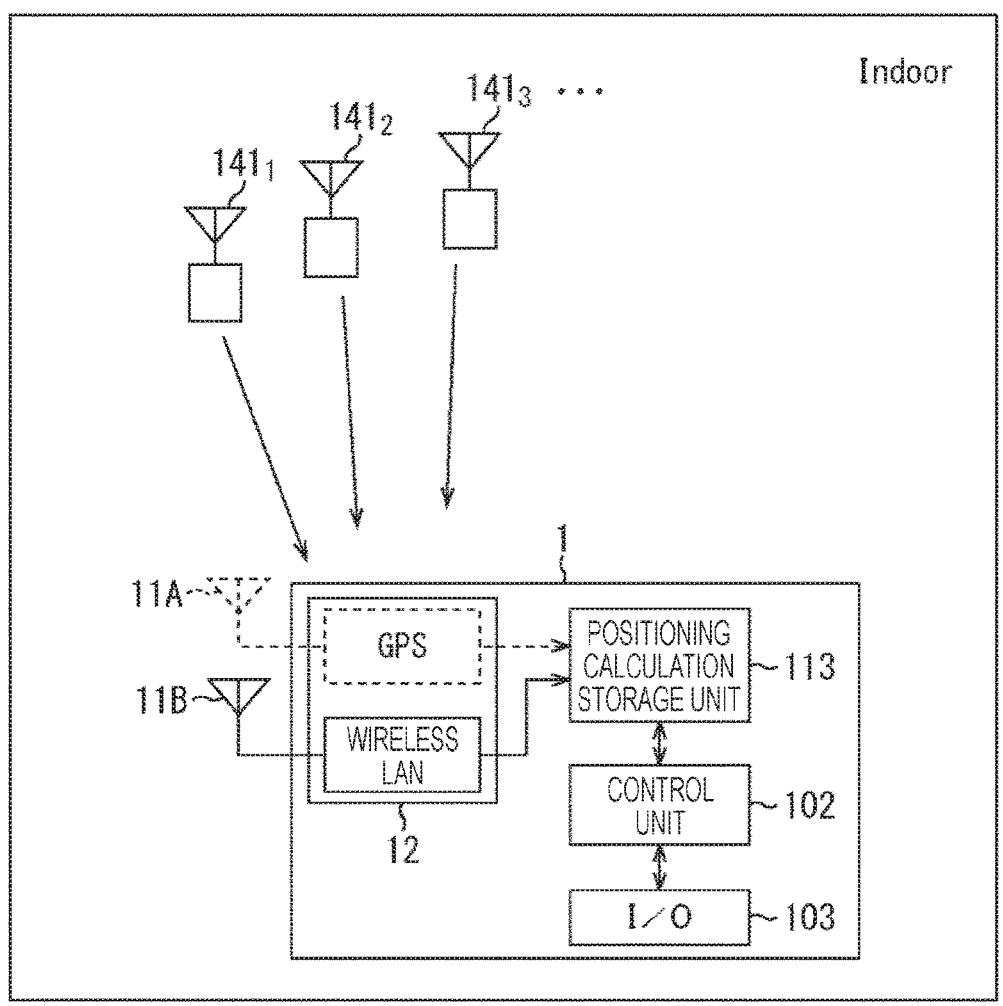
FIG. 13 is a diagram describing a usage example of the receiving device.

When the receiving device 1 is indoors where the signal from the GPS satellite is difficult to receive, as shown in FIG. 13, a predetermined AP 141 (at least one of AP 141$_1$, AP 141$_2$, AP 141$_3$ . . . ) is detected by the wireless LAN, and a MAC address of the detected AP 141 is stored in the memory 113A of the positioning calculation storage unit 113 together with the current time.

Figure 14:
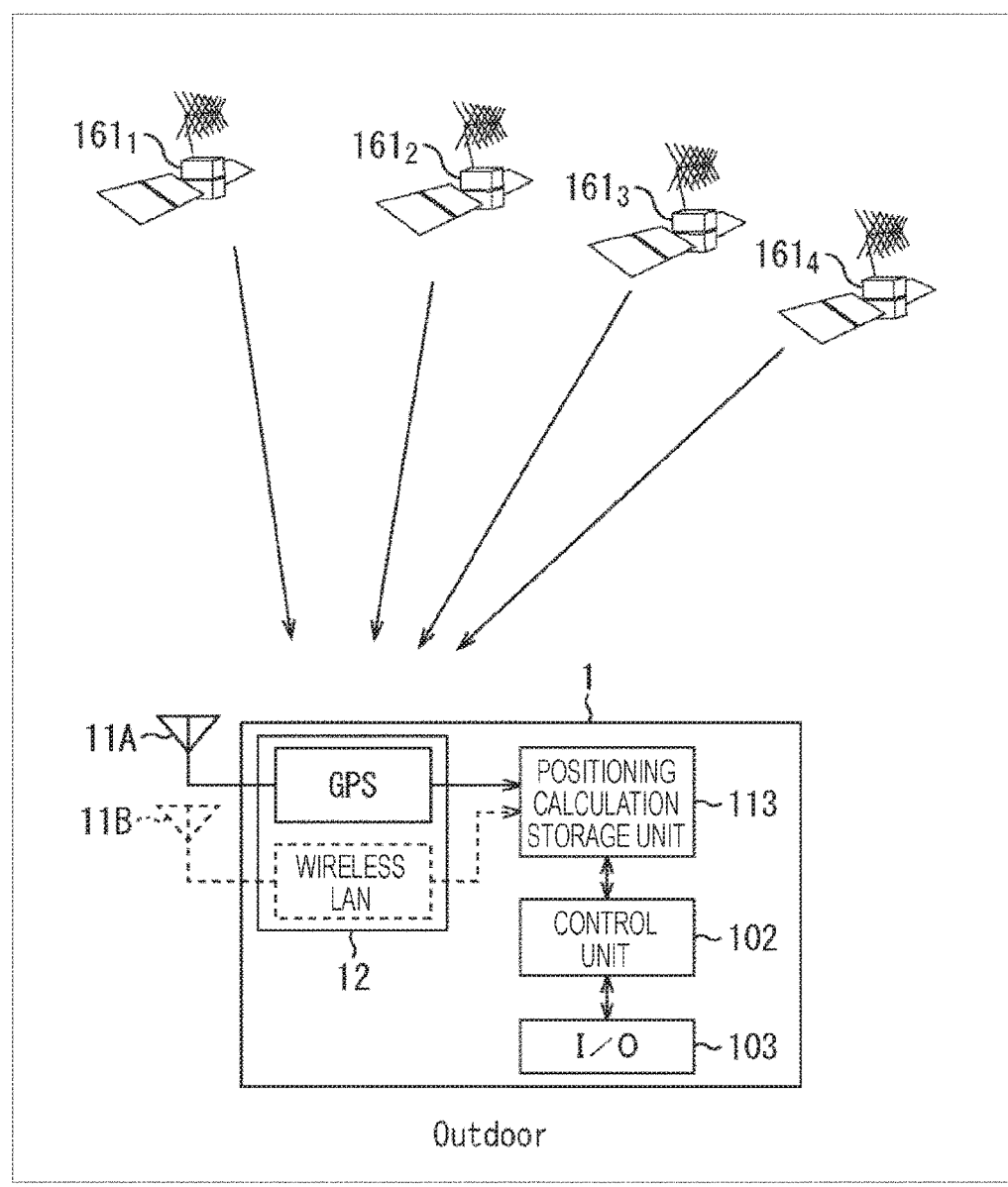
FIG. 14 is a diagram describing the usage example of the receiving device.
Figure 15:
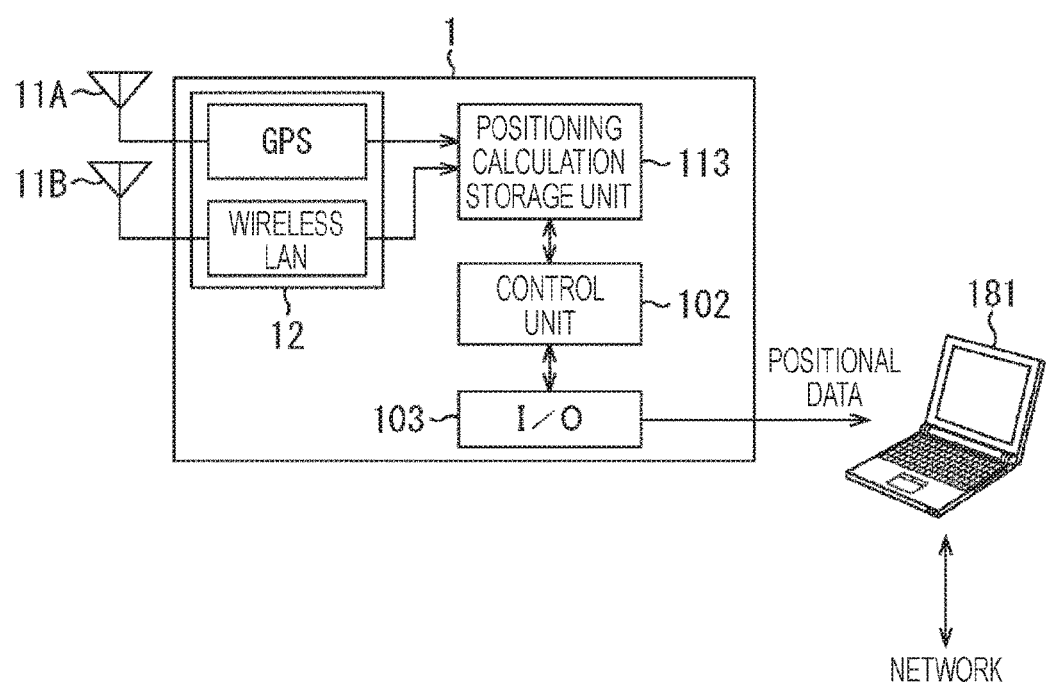
FIG. 15 is a diagram describing the usage example of the receiving device.

On the other hand, when the receiving device 1 is outdoors, as shown in FIG. 14, the GPS signals from at least four GPS satellites 161 (GPS satellites 161$_1$, 161$_2$, 161$_3$, 161$_4$ . . . ) are received. Then, in the positioning calculation storage unit 113, the three-dimensional position of the receiving device 1 is calculated and stored in the memory 113A together with the current time.

Thereafter, when a user returns home or the like, the receiving device 1 is connected to a personal computer 181, and the positional data stored in the memory 113A, that is, the three-dimensional position calculated from the GPS satellite, and the MAC address of the AP 141 are transferred to the personal computer 181.

For example, by collating with the access point DB storing the positional information that indicates the position where the AP that has a predetermined MAC address is installed, the personal computer 181 converts the MAC address into the position of the receiving device 1. Then, the personal computer 181 generates and displays, for example, an action log of the user by integrating the position of the receiving device 1 after the conversion with the three-dimensional position acquired from the receiving device 1. Note that, the access point DB may be saved in a predetermined server (cloud) on the Internet instead of the personal computer 181.

Figure 16:
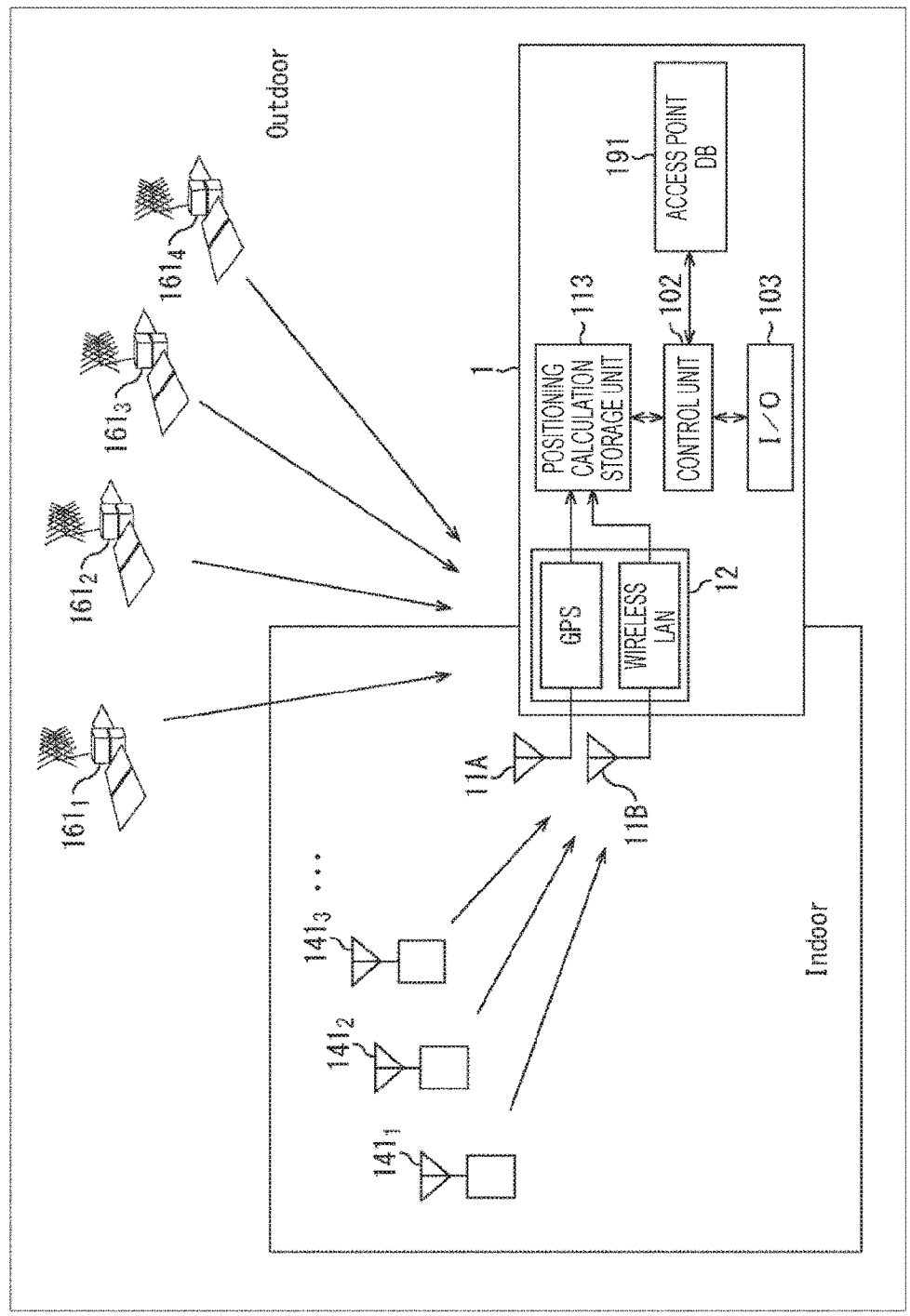
FIG. 16 is a diagram describing a comparative example of the first functional configuration example of the receiving device.

In addition, as shown in FIG. 16, the receiving device 1 may include an access point DB 191 storing the positional information that indicates the position where the AP that has the predetermined MAC address is installed. In such case, when the MAC address is acquired, with reference to the access point DB 191, the current position that corresponds to the MAC address is determined by the control unit 102, and is stored in the memory 113A together with the current time.

Moreover, in correspondence with the MAC address, channel information (frequency information) of the AP may also be stored in the access point DB 191 in addition to the position of the AP. In such case, by scanning in accordance with the channel of the AP in the periphery of the current position acquired from the GPS signal, the AP can be detected quickly. The AP that stores the channel information may be limited to an AP in an living area of the user, or an AP where the user has received within a predetermined period.

<Second Functional Block Diagram of Time-Sharing Reception>

Figure 17:
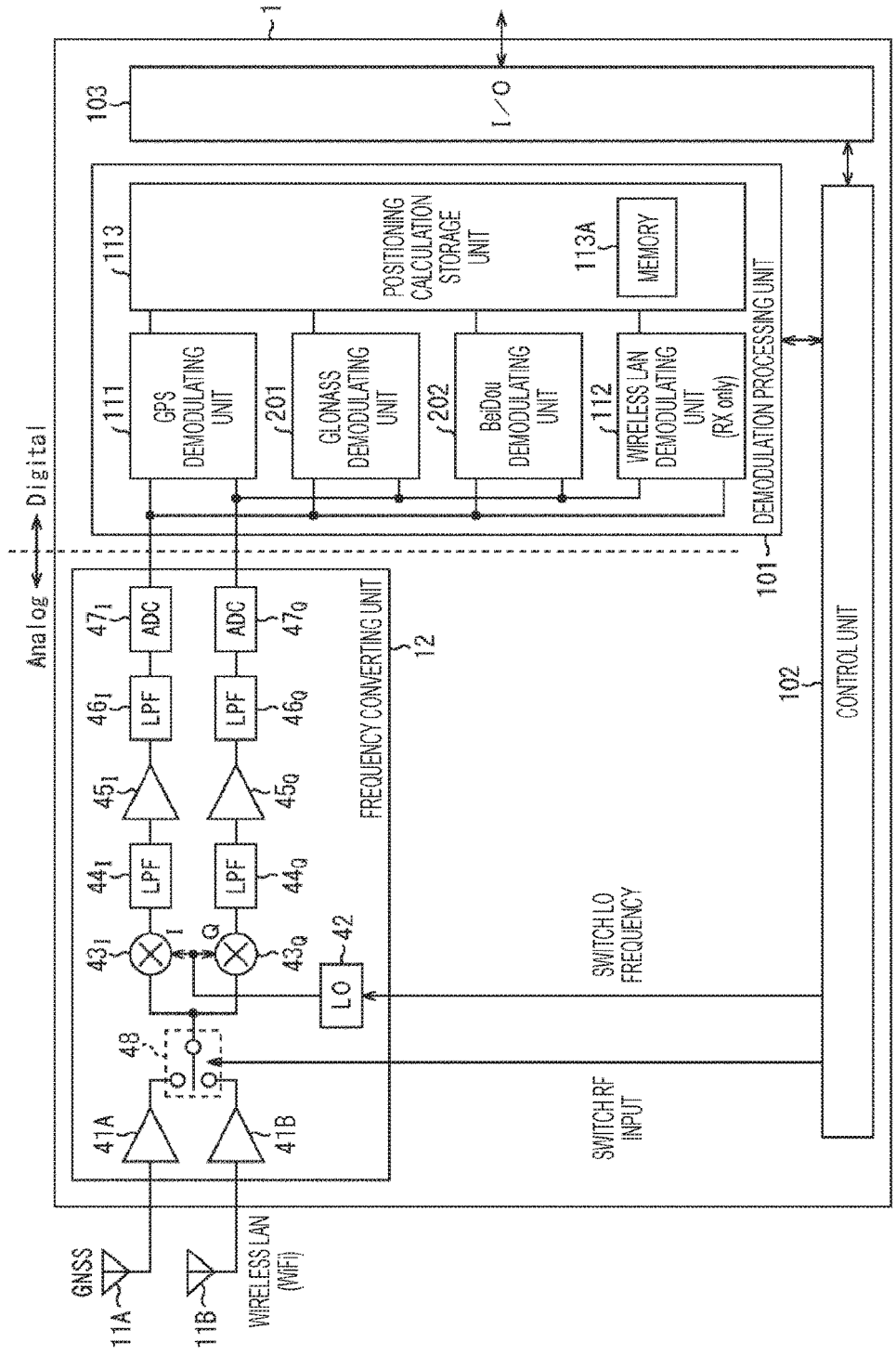
FIG. 17 is a block diagram showing a second functional configuration example of the receiving device.

FIG. 17 is a block diagram showing a second functional configuration example in a case where the receiving device 1 receives the GPS signal and the wireless LAN signal in the time-sharing manner.

Meanwhile, in FIG. 17, the same reference numeral is assigned to a part corresponding to that in FIG. 7 and the description thereof is appropriately omitted.

In the first functional configuration example described above, the signal of the GNSS received by the receiving device 1 has been limited to the signal from the GPS satellite.

However, in the second functional configuration example shown in FIG. 17, a signal of a GNSS other than the GPS satellite, specifically, a GLONASS satellite by Russia and a BeiDou satellite by China, may also be received.

The antenna 11A receives a signal from one of the GPS satellite, the GLONASS satellite, and the BeiDou satellite (hereinafter referred to as a GNSS signal), and supplies the received signal to the LNA 41A. The processes after the LNA 41A are similar to the above.

For example, a signal transmitted from the GLONASS satellite (hereinafter referred to as a GLONASS signal) is a signal in which a carrier wave with 1602 MHz+p×0.5625 MHz (wherein p is a frequency channel number of each satellite) has been modulated by the BPSK method on the basis of a spread spectrum signal with the code length 511 of the 50 bps data, and with 0.511 MHz of the chip rate.

A signal transmitted from the BeiDou satellite (hereinafter referred to as a BeiDou signal) is a signal in which a carrier wave with 1561.098 MHz has been modulated by a QPSK method on the basis of a spread spectrum signal with the code length 2046 of the 50 bps data, and with 2.046 MHz of the chip rate.

The local oscillation circuit 42 generates the local oscillation signal of the LO frequency set on the basis of the control of the control unit 102, and supplies the signal to the multiplying units $43_I$ and $43_Q$. In a case where the receiving device 1 receives the GLONASS signal, the LO frequency is set to, for example, 1,602 MHz. In addition, in a case where the receiving device 1 receives the BeiDou signal, the LO frequency is set to, for example, 1,561.098 MHz.

The demodulation processing unit 101 includes a GLONASS demodulating unit 201 and a BeiDou demodulating unit 202 in addition to the GPS demodulating unit 111, the wireless LAN demodulating unit 112, and the positioning calculation storage unit 113.

The GLONASS demodulating unit 201 demodulates the GLONASS signal input from the frequency converting unit 12, and supplies a demodulation result to the positioning calculation storage unit 113.

The BeiDou demodulating unit 202 demodulates the BeiDou signal input from the frequency converting unit 12, and supplies a demodulation result to the positioning calculation storage unit 113.

Figure 18:
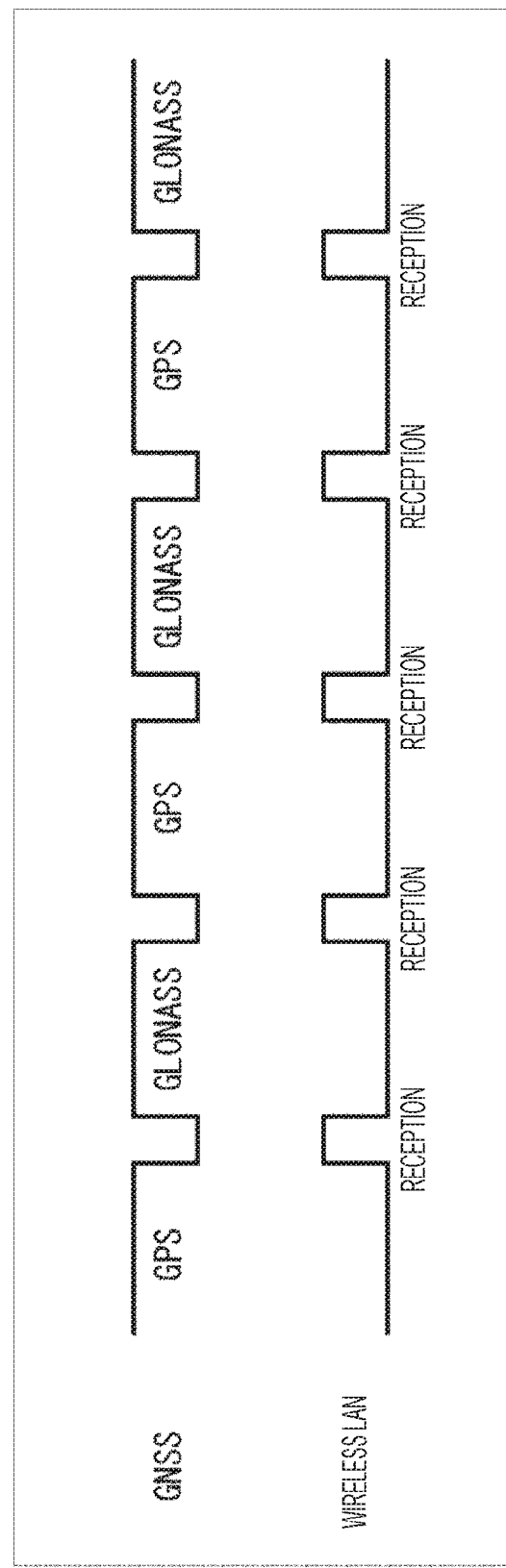
FIG. 18 is a diagram describing a process example of the second functional configuration example of the receiving device.

As shown in FIG. 18, in the reception of the GNSS signal, for example, the GPS signal and the GLONASS signal can be alternately received in the receiving device 1 in FIG. 17.

Accordingly, for example, when there are few satellites for receiving the GPS satellite, the positioning can be performed by receiving the GLONASS signal and combining a plurality of GNSS. Moreover, by determining the current position using the plurality of GNSS, the positioning accuracy of the GNSS can be increased.

Note that, the example in FIG. 18 is an example in which the reception periods and the reception frequencies of the GPS signal and the GLONASS signal have been the same; however, the reception periods and/or the reception frequencies may be different. In addition, the GPS signal and the BeiDou signal may be alternately received.

As described above, according to the second functional configuration example of the receiving device 1, both of the GNSS signal and the wireless LAN signal can be received by sharing the signal process blocks, into which the received IF signals have been down-converted, to receive in the time-sharing manner. As a result, it becomes possible for the receiving device 1 that receives both of the GNSS signal and the wireless LAN signal to be lower at cost and more compact.

<Third Functional Block Diagram of Time-Sharing Reception>

Figure 19:
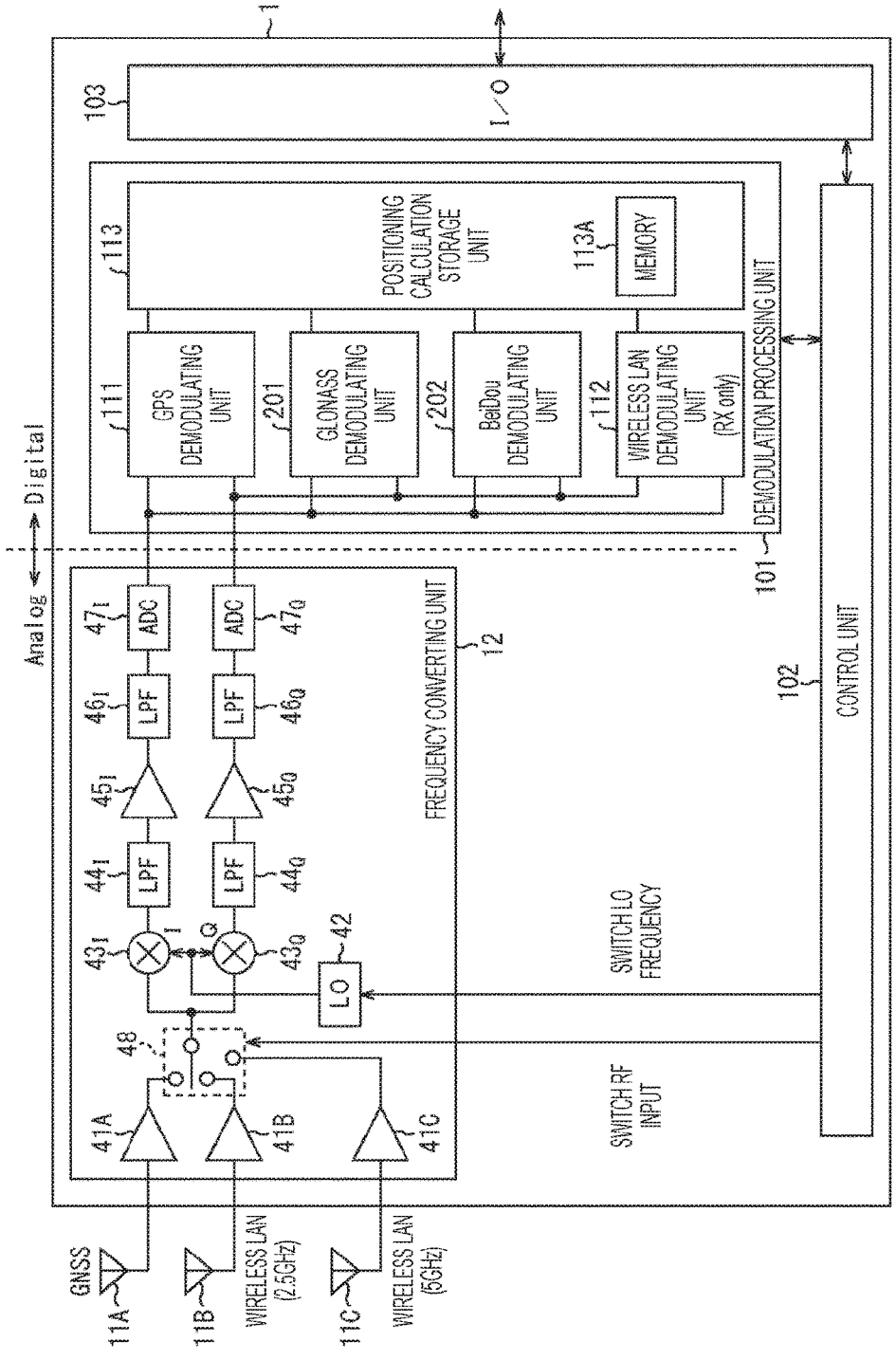
FIG. 19 is a block diagram showing a third functional configuration example of the receiving device.

FIG. 19 is a block diagram showing a third functional configuration example in a case where the receiving device 1 receives the GPS signal and the wireless LAN signal in the time-sharing manner.

Meanwhile, in FIG. 19, the same reference numeral is assigned to a part corresponding to that in FIG. 17 and the description thereof is appropriately omitted.

In the first and second functional configuration examples described above, the antenna 11B has received, as a wireless LAN signal, the wireless LAN signal of the 2.5 GHz band that corresponds to the IEEE 802.11b system.

However, in the third functional configuration example shown in FIG. 19, the receiving device 1 is configured to receive a wireless LAN signal of the 5 GHz band that corresponds to the IEEE 802.11a system in addition to the wireless LAN signal of the 2.5 GHz band that corresponds to the IEEE 802.11b system.

In other words, the receiving device 1 in FIG. 19 further includes an antenna 11C and an LNA 41C in addition to the configuration shown in FIG. 17. The antenna 11C receives the wireless LAN signal of the 5 GHz band that corresponds to the IEEE 802.11a system, and supplies such signal to the LNA 41C. Then, the LNA 41C amplifies the wireless LAN signal from the antenna 11C, and supplies such signal to the selector 48.

While selecting one of the outputs from the LNA 41A to 41C, the control unit 102 controls, in accordance with the selected received signal, the LO frequency of the local oscillation circuit 42. In a case where the receiving device 1 receives the wireless LAN signal of 5 GHz band that corresponds to the IEEE 802.11a system, the LO frequency is set to, for example, 5,150 to 5,350 MHz.

Note that, in the receiving device 1 shown in FIG. 19, the reception periods and the reception frequencies of the wireless LAN signal of the 2.5 GHz band and the wireless LAN signal of the 5 GHz band can be set arbitrarily. Furthermore, in the reception of the GNSS signal, the reception frequency of the reception of any of the GPS signal, the GLONASS signal, and the BeiDou signal is also arbitrary.

According to the third functional configuration example of the receiving device 1, the GNSS signal, the wireless LAN signal of the 2.5 GHz band, and the wireless LAN signal of the 5 GHz band can be received by sharing the signal process blocks, into which the received IF signals have been down-converted. As a result, it becomes possible for the receiving device 1 that receives both signals of the GNSS signal and the wireless LAN to be lower at cost and more compact.

In the embodiment described above, three types of examples such as the signal from the GPS satellite, the signal from the GLONASS satellite, and the signal from the BeiDou satellite, have been described as the GNSS signals.

However, other than the above, the signal may be from a Galileo satellite by the EU, a quasi-zenith satellite (QZSS) as a complementary satellite by Japan, and an indoor messaging system (IMES).

It should be noted that embodiments of the present disclosure are not limited to the embodiments described above, and various modifications may be made thereto without departing from the scope of the present disclosure.

For example, it is possible to employ a combination of all or some of the embodiments described above.

In addition, each step described in the flowchart above can be executed not only by one device but also by a plurality of devices.

Moreover, in a case where a plurality of kinds of processes is included in one step, the plurality of kinds of processes included in the one step can be executed not only by one device but also by a plurality of devices.

Note that, the effects described in the present specification are merely examples, and the effects of the present specification are not limited to them and may include effects other than those described in the present specification.

Note that, the technology of the present disclosure may also be embodied in the following configuration.

(1)
A receiving device including:
a first receiving unit that receives a GNSS signal transmitted from a satellite of a satellite positioning system;
a second receiving unit that receives a wireless LAN signal transmitted from an access point of a wireless LAN;
a selecting unit that selects either the received GNSS signal or wireless LAN signal;
a converting unit that converts the signal selected in the selecting unit into an IF signal with lower intermediate frequency by multiplying the selected signal by a local oscillation signal generated in a local oscillation circuit; and
a control unit that controls the selecting unit, and performs control so that the GNSS signal and the wireless LAN signal are processed in a time-sharing manner in the converting unit.

(2)
The receiving device according to (1), wherein
the control unit variably controls a reception period of the GNSS signal.

(3)
The receiving device according to (2), wherein
the control unit variably controls the reception period of the GNSS signal in accordance with reception strength of the GNSS signal.

(4)
The receiving device according to (2) or (3), wherein
the control unit variably controls a reception period of the wireless LAN signal before and after detection of the access point.

(5)
The receiving device according to any one of (1) to (4), wherein
the control unit also performs control of pausing both reception of the GNSS signal and the wireless LAN signal.

(6)
The receiving device according to any one of (1) to (5), wherein
the first receiving unit receives a first GNSS signal and a second GNSS signal transmitted from satellites of different satellite positioning systems, and the control unit performs control so that the first GNSS signal, the second GNSS signal, and the wireless LAN signal are processed in the time-sharing manner in the converting unit.

(7)
The receiving device according to (6), wherein
reception frequencies of the first GNSS signal and the second GNSS signal are the same.

(8)
The receiving device according to (6), wherein
the reception frequencies of the first GNSS signal and the second GNSS signal are different.

(9)
The receiving device according to any one of (1) to (8), wherein
each receiving period of the wireless LAN signal is equal to or more than a time interval of a beacon.

(10)
The receiving device according to any one of (1) to (9), further including a storage unit that stores unique information of the access point acquired from the wireless LAN signal.

(11)
The receiving device according to (10), wherein
the storage unit also stores channel information of the access point together with the unique information of the access point.

(12)
A receiving method of a receiving device that includes a first receiving unit that receives a GNSS signal transmitted from a satellite of a satellite positioning system, a second receiving unit that receives a wireless LAN signal transmitted from an access point of a wireless LAN, a selecting unit, a converting unit, and a control unit, the receiving method including:
selecting, in the selecting unit, either the received GNSS signal or wireless LAN signal;
converting, in the converting unit, the signal selected in the selecting unit into an IF signal with lower intermediate frequency by multiplying the selected signal by a local oscillation signal generated in a local oscillation circuit; and
in the control unit, controlling the selecting unit, and performing control so that the GNSS signal and the wireless LAN signal are processed in a time-sharing manner in the converting unit.

REFERENCE SIGNS LIST

1 Receiving device
11 Antenna
12 Frequency converting unit
13 Demodulating unit
41 LNA
42 Local oscillation circuit (LO)
43 Multiplier
44 LPF
45 Amplifier
46 LPF
47 ADC
48 Selector
61 Synchronization capturing unit
62 Synchronization holding unit
63 DSSS demodulating unit
64 OFDM demodulating unit
65 CPU
68 Memory
101 Demodulation processing unit 102 Control unit
103 I/O
111 GPS demodulating unit
112 Wireless LAN demodulating unit
113 Positioning calculation storage unit
201 GLONASS demodulating unit
202 BeiDou demodulating unit

The invention claimed is:

1. A receiving device, comprising:
   a first receiving unit configured to receive a first GNSS signal, wherein the first GNSS signal is transmitted from a first satellite of a first satellite positioning system;
   a second receiving unit configured to receive a wireless LAN signal, wherein the wireless LAN signal is transmitted from an access point of a wireless LAN;
   a selecting unit configured to select one of the received first GNSS signal or the received wireless LAN signal;
   a local oscillation circuit configured to generate an oscillation signal;
   a converting unit configured to convert the selected one of the received GNSS signal or the received wireless signal into an IF signal with lower intermediate frequency by multiplication of the selected one of the received GNSS signal or the received wireless signal and the oscillation signal; and
   a control unit configured to control the selecting unit to process the first GNSS signal and the wireless LAN signal in a time-sharing manner in the converting unit.

2. The receiving device according to claim 1, wherein the control unit is further configured to variably control a reception period of the first GNSS signal.

3. The receiving device according to claim 2, wherein the control unit is further configured to variably control the reception period of the first GNSS signal based on reception strength of the first GNSS signal.

4. The receiving device according to claim 1, wherein the control unit is further configured to variably control a reception period of the wireless LAN signal before and after detection of the access point.

5. The receiving device according to claim 1, wherein the control unit is further configured to pause the reception of each of the first GNSS signal and the wireless LAN signal.

6. The receiving device according to claim 1,
   wherein the first receiving unit is further configured to receive a second GNSS signal and a third GNSS signal transmitted from second satellites of second satellite positioning systems, wherein each of the second satellite positioning systems is different from the first satellite positioning system, and
   wherein the control unit is further configured to control the selecting unit to process the second GNSS signal, the third GNSS signal, and the wireless LAN signal in the time-sharing manner in the converting unit.

7. The receiving device according to claim 6, wherein reception frequencies of the second GNSS signal and the third GNSS signal are same.

8. The receiving device according to claim 6, wherein the reception frequencies of the second GNSS signal and the third GNSS signal are different.

9. The receiving device according to claim 1, wherein each receiving period of the wireless LAN signal is equal to or greater than a time interval of a beacon.

10. The receiving device according to claim 1, further comprising a storage unit configured to store unique information of the access point in the received wireless LAN signal.

11. The receiving device according to claim 10, wherein the storage unit is further configured to store channel information of the access point with the unique information of the access point.

12. A receiving method, comprising:
   in a receiving device:
      receiving, by a first receiving unit of the receiving device, a GNSS signal, wherein the GNSS signal is transmitted from a satellite of a satellite positioning system;
      receiving, by a second receiving unit of the receiving device, a wireless LAN signal, wherein the wireless LAN signal is transmitted from an access point of a wireless LAN;
      selecting, by a selecting unit of the receiving device, one of the received GNSS signal or the received wireless LAN signal;
      generating, by a oscillation circuit of the receiving device, an oscillation signal;
      converting, by a converting unit of the receiving device, the selected one of the received GNSS signal or the received wireless signal into an IF signal with lower intermediate frequency by multiplication of the selected one of the received GNSS signal or the received wireless signal and the oscillation signal; and
      controlling, by a control unit of the receiving device, the selecting unit to process the GNSS signal and the wireless LAN signal in a time-sharing manner in the converting unit.

* * * * *